United States Patent
Lam et al.

(10) Patent No.: US 10,294,123 B2
(45) Date of Patent: May 21, 2019

(54) HUMIDIFICATION-DEHUMIDIFICATION SYSTEMS AND METHODS AT LOW TOP BRINE TEMPERATURES

(71) Applicant: Gradiant Corporation, Woburn, MA (US)

(72) Inventors: Steven Lam, Singapore (SG); Conor Thomas Wilson, Somerville, MA (US); Maximus G. St. John, Singapore (SG); Prakash Narayan Govindan, Singapore (SG)

(73) Assignee: Gradiant Corporation, Woburn, MA (US)

( * ) Notice: Subject to any disclaimer, the term of this patent is extended or adjusted under 35 U.S.C. 154(b) by 189 days.

(21) Appl. No.: 15/161,051

(22) Filed: May 20, 2016

(65) Prior Publication Data
US 2017/0334736 A1  Nov. 23, 2017

(51) Int. Cl.
*B01F 3/04* (2006.01)
*C02F 1/04* (2006.01)
(Continued)

(52) U.S. Cl.
CPC ............... *C02F 1/048* (2013.01); *B01D 1/14* (2013.01); *B01D 3/346* (2013.01); *B01D 5/003* (2013.01);
(Continued)

(58) Field of Classification Search
CPC .......... B01D 1/14; B01D 5/003; B01D 3/346; B01F 3/04106; B01F 3/04262;
(Continued)

(56) References Cited

U.S. PATENT DOCUMENTS 2,560,073 A    7/1951  Bloomer
2,560,978 A    7/1951  Persson et al.
(Continued)

FOREIGN PATENT DOCUMENTS

CN    1140763 C    3/2004
CN    1791557 A    6/2006
(Continued)

OTHER PUBLICATIONS

International Search Report and Written Opinion for PCT/US2017/033557 dated Aug. 15, 2017.
(Continued)

*Primary Examiner* — Charles S Bushey
(74) *Attorney, Agent, or Firm* — Wolf, Greenfield & Sacks, P.C.

(57) ABSTRACT

Embodiments described generally relate to systems comprising a humidifier (e.g., a bubble column humidifier) and a heating device (e.g. a heat exchanger), and associated methods. In certain embodiments, the heating device heats a first liquid stream comprising a condensable fluid in liquid phase (e.g., water) and a dissolved salt (e.g., NaCl) to a relatively low temperature (e.g., about 90° C. or less) prior to the first liquid stream entering the humidifier through a main humidifier liquid inlet. In some cases, the system comprising the humidifier and the heating device requires only low-grade heat to operate, which may be advantageous due to the low cost and high availability of such heat.

20 Claims, 6 Drawing Sheets

(51) Int. Cl.
  *B01D 1/14* (2006.01)
  *B01D 5/00* (2006.01)
  *B01D 3/34* (2006.01)
  *C02F 101/12* (2006.01)
  *C02F 103/08* (2006.01)

(52) U.S. Cl.
  CPC ...... *B01F 3/04106* (2013.01); *B01F 3/04262* (2013.01); *B01F 2215/0052* (2013.01); *C02F 2101/12* (2013.01); *C02F 2103/08* (2013.01); *Y02W 10/37* (2015.05)

(58) Field of Classification Search
  CPC .............. B01F 2215/0052; C02F 1/048; C02F 2101/12; C02F 2103/08; Y02W 10/37
  USPC .......................... 261/30, 113, 128, 148, 149
  See application file for complete search history.

(56) References Cited

U.S. PATENT DOCUMENTS

| | | | |
|---|---|---|---|
| 2,702,696 | A | 2/1955 | Pappas et al. |
| 3,196,864 | A | 7/1965 | Johnson |
| 3,214,349 | A | 10/1965 | Kehoe et al. |
| 3,214,351 | A | 10/1965 | Lichtenstein et al. |
| 3,220,483 | A | 11/1965 | Hoevenaar |
| 3,232,847 | A | 2/1966 | Hoff |
| 3,243,358 | A | 3/1966 | McCue |
| 3,257,291 | A | 6/1966 | Heinz |
| 3,288,686 | A | 11/1966 | Othmer |
| 3,425,935 | A | 2/1969 | Cahn |
| 3,434,701 | A | 3/1969 | Bauer |
| 3,478,531 | A | 11/1969 | Karnofsky |
| 3,558,436 | A | 1/1971 | Foley et al. |
| 3,583,895 | A | 6/1971 | Othmer |
| 3,606,999 | A | 9/1971 | Lawless |
| 3,653,186 | A | 4/1972 | McLendon |
| 3,755,088 | A | 8/1973 | Osdor |
| 3,783,108 | A | 1/1974 | Koivisto et al. |
| 3,826,815 | A | 7/1974 | Mavrovic |
| 3,860,492 | A | 1/1975 | Lowi et al. |
| 3,906,250 | A | 9/1975 | Loeb |
| 4,072,182 | A | 2/1978 | Cheng |
| 4,105,723 | A | 8/1978 | Mix |
| 4,252,546 | A | 2/1981 | Krugmann |
| 4,276,124 | A | 6/1981 | Mock |
| 4,334,886 | A | 6/1982 | Tani et al. |
| 4,363,703 | A | 12/1982 | ElDifrawi et al. |
| 4,426,322 | A | 1/1984 | Stage |
| 4,595,459 | A | 6/1986 | Kusakawa |
| 4,624,747 | A | 11/1986 | el Din Nasser |
| 4,762,593 | A | 8/1988 | Youngner |
| 4,799,941 | A | 1/1989 | Westermark |
| 4,820,456 | A | 4/1989 | Kiselev |
| 4,832,115 | A | 5/1989 | Albers et al. |
| 5,096,543 | A | 3/1992 | Elmore |
| 5,123,481 | A | 6/1992 | Albers et al. |
| 5,124,004 | A | 6/1992 | Grethlein et al. |
| 5,176,798 | A | 1/1993 | Rodden |
| 5,290,403 | A | 3/1994 | Saask |
| 5,378,267 | A | 1/1995 | Bros et al. |
| 5,552,022 | A | 9/1996 | Wilson |
| 5,617,719 | A | 4/1997 | Ginter |
| 5,724,828 | A | 3/1998 | Korenic |
| 5,939,031 | A | 8/1999 | Ellis et al. |
| 6,348,137 | B1 | 2/2002 | Nommensen |
| 6,423,235 | B1 | 7/2002 | Shimoi et al. |
| 6,911,121 | B1 | 6/2005 | Beckman, Jr. |
| 6,919,000 | B2 | 7/2005 | Klausner et al. |
| 7,225,620 | B2 | 6/2007 | Klausner et al. |
| 7,621,991 | B2 | 11/2009 | Ruan |
| 7,823,503 | B2 | 11/2010 | Ringstrom |
| 7,832,714 | B2 | 11/2010 | Duesel et al. |
| 7,938,888 | B2 | 5/2011 | Assaf |
| 8,119,007 | B2 | 2/2012 | Bajpayee et al. |
| 8,197,693 | B2 | 6/2012 | Al-Jlil |
| 8,252,092 | B2 | 8/2012 | Govindan et al. |
| 8,292,272 | B2 | 10/2012 | Elsharqawy et al. |
| 8,444,829 | B2 | 5/2013 | Godshall et al. |
| 8,465,006 | B2 | 6/2013 | Elsharqawy et al. |
| 8,496,234 | B1 | 7/2013 | Govindan et al. |
| 8,501,007 | B2 | 8/2013 | Bajpayee et al. |
| 8,523,985 | B2 | 9/2013 | Govindan et al. |
| 8,647,477 | B2 | 2/2014 | Govindan et al. |
| 8,695,343 | B2 | 4/2014 | Moe |
| 8,778,065 | B2 | 7/2014 | Govindan et al. |
| 8,801,910 | B2 | 8/2014 | Bazant et al. |
| 8,820,723 | B1 | 9/2014 | Sparrow et al. |
| 9,072,984 | B2 | 7/2015 | Govindan et al. |
| 9,079,117 | B2 | 7/2015 | Govindan et al. |
| 9,120,033 | B2 | 9/2015 | Govindan et al. |
| 9,221,694 | B1 | 12/2015 | Govindan et al. |
| 9,266,747 | B1 | 2/2016 | Sparrow et al. |
| 9,266,748 | B1 | 2/2016 | Govindan et al. |
| 9,320,984 | B2 | 4/2016 | Govindan et al. |
| 9,364,771 | B2 | 6/2016 | Govindan et al. |
| 9,403,104 | B2 | 8/2016 | Govindan et al. |
| 9,416,800 | B2 | 8/2016 | Govindan et al. |
| 9,428,404 | B2 | 8/2016 | Bajpayee et al. |
| 9,468,864 | B2 | 10/2016 | Govindan et al. |
| 9,550,685 | B2 | 1/2017 | Klausner et al. |
| 9,556,041 | B2 | 1/2017 | Govindan et al. |
| 9,579,590 | B2 | 2/2017 | Govindan et al. |
| 9,617,169 | B2 | 4/2017 | Govindan et al. |
| 9,643,102 | B2 | 5/2017 | Al-Sulaiman et al. |
| 9,700,811 | B2 | 7/2017 | Govindan et al. |
| 9,790,102 | B2 * | 10/2017 | Govindan ............... B01D 1/14 |
| 9,981,860 | B2 | 5/2018 | Govindan et al. |
| 10,053,373 | B2 | 8/2018 | Govindan et al. |
| 2002/0053505 | A1 | 5/2002 | Arrison |
| 2002/0166758 | A1 | 11/2002 | Vinz |
| 2003/0092876 | A1 | 5/2003 | Beek et al. |
| 2004/0026225 | A1 | 2/2004 | Domen |
| 2004/0163536 | A1 | 8/2004 | Baudat et al. |
| 2004/0231970 | A1 | 11/2004 | Lee et al. |
| 2005/0033585 | A1 | 2/2005 | Shields |
| 2005/0121304 | A1 | 6/2005 | Beckman |
| 2005/0126175 | A1 | 6/2005 | Badgley |
| 2005/0230238 | A1 | 10/2005 | Klausner et al. |
| 2006/0231377 | A1 | 10/2006 | Costa |
| 2006/0272933 | A1 | 12/2006 | Domen et al. |
| 2007/0017205 | A1 | 1/2007 | Sasaki et al. |
| 2008/0083605 | A1 | 4/2008 | Holtzapple et al. |
| 2008/0105534 | A1 | 5/2008 | Taylor et al. |
| 2010/0147673 | A1 | 6/2010 | Passarelli |
| 2010/0314228 | A1 | 12/2010 | Huang |
| 2010/0314238 | A1 | 12/2010 | Frolov et al. |
| 2011/0056822 | A1 | 3/2011 | Elsharqawy et al. |
| 2011/0079504 | A1 | 4/2011 | Govindan et al. |
| 2011/0233137 | A1 | 9/2011 | Cath et al. |
| 2011/0266132 | A1 | 11/2011 | Takezaki |
| 2012/0031303 | A1 | 2/2012 | Contantz et al. |
| 2012/0091061 | A1 | 4/2012 | Al-Jlil |
| 2012/0112808 | A1 | 5/2012 | Yotsuji |
| 2012/0159203 | A1 | 6/2012 | Gervais et al. |
| 2012/0205236 | A1 | 8/2012 | Govindan et al. |
| 2013/0074694 | A1 | 3/2013 | Govindan et al. |
| 2013/0075940 | A1 | 3/2013 | Govindan et al. |
| 2013/0118887 | A1 | 5/2013 | Frovlov et al. |
| 2013/0199921 | A1 | 8/2013 | McGovern |
| 2013/0220927 | A1 | 8/2013 | Moody et al. |
| 2014/0014212 | A1 | 1/2014 | Govindan et al. |
| 2014/0061958 | A1 | 3/2014 | Sparrow et al. |
| 2014/0197022 | A1 | 7/2014 | Antar et al. |
| 2014/0367871 | A1 | 12/2014 | Govindan et al. |
| 2015/0060286 | A1 | 3/2015 | Govindan et al. |
| 2015/0068886 | A1 | 3/2015 | Domen et al. |
| 2015/0083577 | A1 | 3/2015 | Govindan et al. |
| 2015/0107840 | A1 | 4/2015 | Ligthelm et al. |
| 2015/0129410 | A1 | 5/2015 | Govindan et al. |
| 2015/0130093 | A1 | 5/2015 | Govindan et al. |
| 2015/0166362 | A1 | 6/2015 | Govindan et al. |
| 2015/0190730 | A1 | 7/2015 | Govindan et al. |
| 2015/0190731 | A1 | 7/2015 | Govindan et al. |

(56) References Cited

U.S. PATENT DOCUMENTS

| | | |
|---|---|---|
| 2015/0260418 A1 | 9/2015 | Govindan et al. |
| 2015/0290557 A1 | 10/2015 | Govindan et al. |
| 2015/0321118 A1 | 11/2015 | Govindan et al. |
| 2015/0329377 A1 | 11/2015 | Govindan et al. |
| 2015/0353377 A1 | 12/2015 | Al-Sulaiman et al. |
| 2015/0368121 A1 | 12/2015 | Govindan et al. |
| 2016/0137526 A1 | 5/2016 | Govindan et al. |
| 2016/0228795 A1 | 8/2016 | St John et al. |
| 2016/0229705 A1 | 8/2016 | St John et al. |
| 2016/0229714 A1 | 8/2016 | Thiel et al. |
| 2016/0271518 A1 | 9/2016 | Govindan et al. |
| 2016/0339354 A1 | 11/2016 | Govindan et al. |
| 2016/0339356 A1 | 11/2016 | Govindan et al. |
| 2016/0339357 A1 | 11/2016 | Govindan et al. |
| 2016/0375375 A1 | 12/2016 | Govindan et al. |
| 2017/0113947 A1 | 4/2017 | Govindan et al. |
| 2017/0152156 A1 | 6/2017 | Al-Qutub et al. |
| 2017/0203977 A1 | 7/2017 | Govindan et al. |
| 2017/0334737 A1 | 11/2017 | Govindan et al. |
| 2018/0236372 A1 | 8/2018 | Govindan et al. |

FOREIGN PATENT DOCUMENTS

| | | |
|---|---|---|
| CN | 101538070 | 9/2011 |
| DE | 1 070 594 B | 12/1959 |
| DE | 3 147 460 A1 | 6/1983 |
| EP | 0 099 320 A2 | 1/1984 |
| EP | 0 253 287 B1 | 9/1992 |
| EP | 1 443 025 A1 | 8/2004 |
| FR | 2 281 896 A1 | 3/1976 |
| FR | 2 713 219 A1 | 6/1995 |
| FR | 2 786 708 A1 | 6/2000 |
| GB | 698 966 A | 10/1953 |
| GB | 780 272 A | 7/1957 |
| GB | 1 235 760 A | 6/1971 |
| GB | 1 241 174 A | 7/1971 |
| GB | 1 265 188 A | 3/1972 |
| JP | S49-63699 A | 6/1974 |
| JP | S49-75935 U | 7/1974 |
| JP | S51-42078 A | 4/1976 |
| JP | S55-9508 A | 1/1980 |
| JP | 2006-312134 A | 11/2006 |
| RU | 2239460 C1 | 11/2004 |
| WO | WO 01/07134 A1 | 2/2001 |
| WO | WO 01/14256 A1 | 3/2001 |
| WO | WO 02/32813 A1 | 4/2002 |
| WO | WO 2004/026767 A2 | 4/2004 |
| WO | WO 2004/067451 A1 | 8/2004 |
| WO | WO 2005/033585 | 4/2005 |
| WO | WO 2005/075045 A1 | 8/2005 |
| WO | WO 2005/100252 A1 | 10/2005 |
| WO | WO 2007/132477 | 11/2007 |
| WO | WO 2009/103112 A1 | 8/2009 |
| WO | WO 2011/028853 | 3/2011 |
| WO | WO 2011/043945 A1 | 4/2011 |
| WO | WO 2011/137149 | 11/2011 |
| WO | WO 2012/112808 A2 | 8/2012 |
| WO | WO 2012/159203 | 11/2012 |
| WO | WO 2013/037047 | 3/2013 |
| WO | WO 2013/072709 A2 | 5/2013 |
| WO | WO 2013/150040 A2 | 10/2013 |
| WO | WO 2013/158315 | 10/2013 |
| WO | WO 2014/200829 | 12/2014 |
| WO | WO 2015/021062 A1 | 2/2015 |
| WO | WO 2015/042584 | 3/2015 |
| WO | WO 2015/061194 A1 | 4/2015 |
| WO | WO 2016/003913 | 1/2016 |
| WO | WO 2017/030941 A1 | 2/2017 |
| WO | WO 2017/127607 A1 | 7/2017 |

OTHER PUBLICATIONS

Achilli et al., Selection of inorganic-based draw solutions for forward osmosis applications. Journal of Membrane Science. 2010;364:233-41. Epub Aug. 14, 2010.

Alshakhs, Modifying Water Salinity to Improve Oil Recovery. Stanford Academic Report. Oct. 29, 2013. Last accessed on Dec. 8, 2016 at <http://large.stanford.edu/courses/2013/ph240/alshakhs1/>. 2 pages.

Aly et al., Modelling and simulation of steam jet ejectors. Desalination. 1999;123(1):1-8.

Chung et al., Forward osmosis processes: Yesterday, today and tomorrow. Desalination. 2012;287:78-81. Epub Jan. 11, 2011.

Ge et al., Exploration of polyelectrolytes as draw solutes in forward osmosis processes. Water Research. 2012;46:1318-26. Epub Dec. 27, 2011.

Govindan, Thermal Design of Humidification Dehumidification Systems for Affordable and Small-scale Desalination. Doctoral Thesis. Massachusetts Institute of Technology. Sep. 2012 286 pages.

Kronenberg et al., Low-temperature distillation processes in single- and dual-purpose plants. Desalination. 2001;136:189-97.

Kwak et al., New Insights on the Role of Multivalent Ions I Water-Carbonate Rock Interactions. Saudi Journal of Technology. 2014:25-38. Last accessed on Dec. 8, 2016 at <http://www.saudiaramco.com/content/dam/Publications/Journal-of-Technology/Summer2014/New_Insights.pdf>.

McGinnis et al., Pilot demonstration of the NH3/CO2 forward osmosis desalination process on high salinity brines. Desalination. Mar. 2013;312:67-74. Supporting information included.

Nawayseh et al., Solar desalination based on humidification process— I. Evaluating the heat and mass transfer coefficients. Energy Conversion and Management. Sep. 1999;40(13):1423-39.

Nawayseh et al., Solar desalination based on humidification process— II. Computer Simulation. Energy Conversion and Management. Sep. 1999;40(13):1441-61.

Akram et al., Energy Utilization of Brine from an MSF Desalination Plant by Pressure Retarded Osmosis. The International Desalination Association World Congress on Desalination and Water Reuse. Tianjin, China. Oct. 2013 12 pages.

Banchik et al., Thermodynamic Analysis of a Reverse Osmosis Desalination System Using Forward Osmosis for Energy Recovery. Proceedings of the ASME 2012 International Mechanical Engineering Congress & Exposition. American Society of Mechanical Engineers. Houston, Texas. Nov. 9-15, 2012. 13 pages.

Thiel et al., Hybridization of Humidification-Dehumidification and Pressure Retarded Osmosis for Brine Concentration Applications. The International Desalination Association World Congress on Desalination and Water Reuse. San Diego, California. Aug.-Sep. 2015 8 pages.

[No Author Listed], Recuperator. Wikipedia Entry. As edited on Jul. 17, 2012. Accessed May 11, 2018 at <https://en.wikipedia.org/w/index.php?title=Recuperator&oldid=502784184>. 3 pages.

Ribeiro et al., Gas-Liquid Direct-Contact Evaporation: A Review. Chem. Eng. Technol. 2005;28(10):1081-107.

* cited by examiner

HUMIDIFICATION-DEHUMIDIFICATION SYSTEMS AND METHODS AT LOW TOP BRINE TEMPERATURES

TECHNICAL FIELD

Disclosed embodiments generally relate to systems comprising a humidifier and a heating device, and associated methods.

BACKGROUND

Fresh water shortages are becoming an increasing problem around the world, with demand for fresh water for human consumption, irrigation, and/or industrial use continuing to grow. In order to meet the growing demand for fresh water, various desalination methods may be used to produce fresh water from salt-containing water such as seawater, brackish water, water produced from oil and/or gas extraction processes, flowback water, and/or wastewater. For example, one desalination method is a humidification-dehumidification (HDH) process, which involves contacting salt-containing water with a carrier gas in a humidifier, such that the carrier gas becomes heated and humidified. The heated and humidified gas is then brought into contact with cold water in a dehumidifier, thereby producing purified water.

However, HDH systems and processes often involve certain drawbacks. For example, an influent stream is often heated to a relatively high temperature prior to being introduced into a humidifier of an HDH system in order to increase efficiency and/or production rate of the system. In some cases, the heating step may require relatively large amounts of energy, which may be expensive and/or difficult to obtain. HDH systems with improved properties, such as lower temperature requirements for influent streams, are therefore desirable.

SUMMARY

Systems comprising a humidifier and a heating device, and associated methods, are disclosed. The subject matter of the present invention involves, in some cases, interrelated products, alternative solutions to a particular problem, and/or a plurality of different uses of one or more systems and/or articles.

Some aspects relate to a system comprising a humidifier. According to some embodiments, the humidifier comprises a main humidifier liquid inlet; a main humidifier gas inlet; a main humidifier liquid outlet; an intermediate humidifier liquid outlet; a main humidifier gas outlet; and a plurality of stages. In certain embodiments, the plurality of stages comprises a first stage, a last stage, and one or more intermediate stages positioned between the first stage and the last stage. In certain embodiments, the intermediate humidifier liquid outlet is a liquid outlet of the first stage or one of the one or more intermediate stages. According to some embodiments, the system further comprises a first heating device. In certain embodiments, a first liquid inlet of the first heating device comprises or is fluidically connected to the intermediate humidifier liquid outlet. In certain embodiments, a first liquid outlet of the first heating device comprises or is fluidically connected to the main humidifier liquid inlet. In some embodiments, the first liquid inlet of the first heating device is configured to receive a first liquid stream comprising a condensable fluid in liquid phase and a dissolved salt. In some embodiments, the main humidifier gas inlet is configured to receive a gas stream comprising a non-condensable gas.

Some aspects relate to a method of operating a humidifier. According to some embodiments, the method comprises flowing a first liquid stream comprising a condensable fluid in liquid phase and a dissolved salt through a first fluidic pathway of a first heating device. In certain embodiments, the first liquid stream is heated within the first heating device to form a heated first liquid stream. In some embodiments, the method further comprises injecting the heated first liquid stream into a main liquid inlet of a humidifier comprising a plurality of stages. In certain embodiments, the plurality of stages comprises a first stage, a last stage, and one or more intermediate stages positioned between the first stage and the last stage. In some embodiments, the method further comprises injecting a gas stream comprising a non-condensable gas into a main gas inlet of the humidifier. In some embodiments, the method further comprises flowing the heated first liquid stream through the humidifier in a first direction from the first stage to the last stage and simultaneously flowing the gas stream through the humidifier in a second direction from the last stage to the first stage. In certain embodiments, heat and mass are transferred from the heated first liquid stream to the gas stream to produce a vapor-containing humidifier gas outlet stream and a concentrated liquid stream. In some embodiments, the method further comprises flowing an extracted liquid stream comprising at least a portion of the concentrated liquid stream from an intermediate liquid outlet of the humidifier to the first heating device. In certain embodiments, the intermediate liquid outlet of the humidifier is a liquid outlet of the first stage or one of the one or more intermediate stages of the humidifier.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
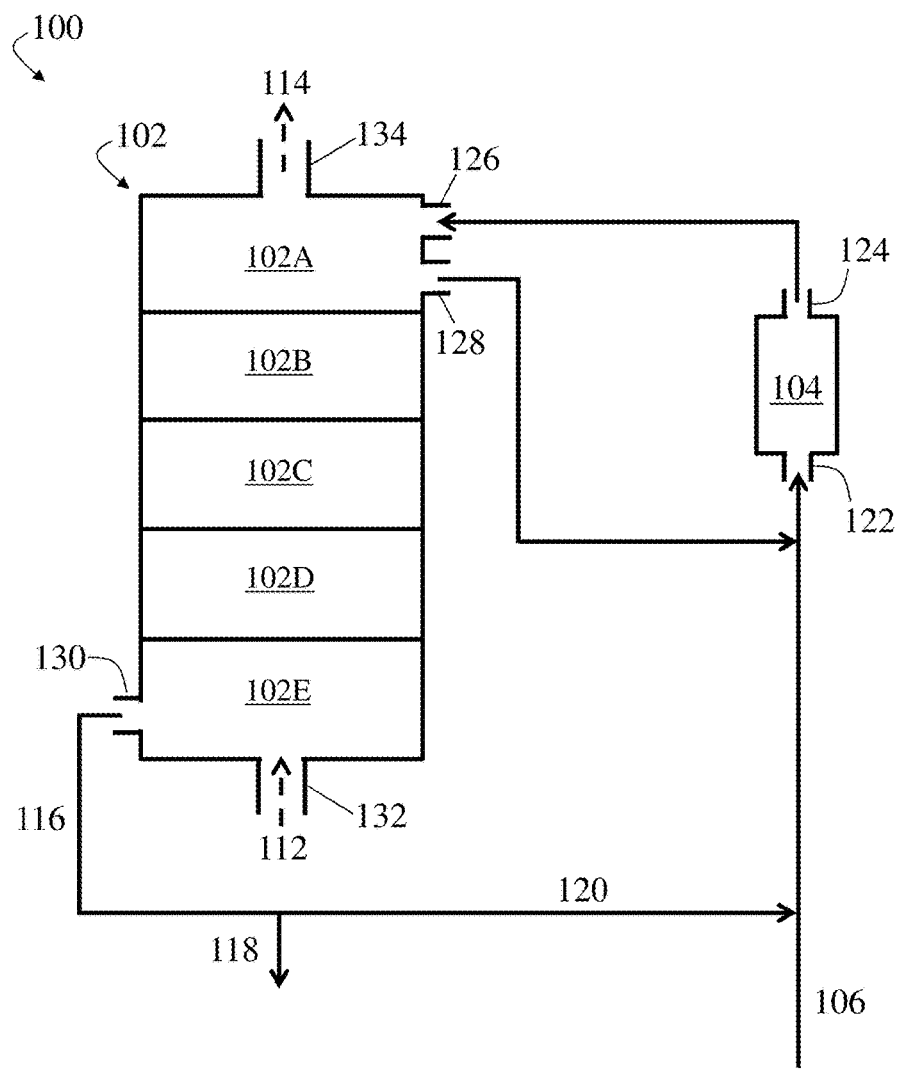
FIG. 1 shows, according to some embodiments, a schematic diagram of an exemplary system comprising a multi-stage humidifier and a heating device.

Embodiments described herein generally relate to systems comprising a humidifier (e.g., a bubble column humidifier) and a heating device, and associated methods. In certain embodiments, the heating device heats a first liquid stream comprising a condensable fluid in liquid phase (e.g., water) and a dissolved salt (e.g., NaCl) to a relatively low temperature (e.g., about 90° C. or less) prior to the first liquid stream entering the humidifier through a main humidifier liquid inlet. In some cases, the system comprising the humidifier and the heating device requires only low-grade heat to operate, which may be advantageous due to the low cost and high availability of such heat.

In some embodiments, the first liquid stream flows through the humidifier in a first direction, and a gas stream comprising a non-condensable gas (e.g., air) flows through the humidifier in a second direction. Within the humidifier, heat and mass may be transferred from the first liquid stream to the gas stream (e.g., via evaporation) to produce a vapor-containing humidifier gas outlet stream enriched in the condensable fluid in vapor phase relative to the gas stream and a concentrated liquid stream enriched in the dissolved salt relative to the first liquid stream. In some embodiments, a portion of the concentrated liquid stream exits the humidifier through an intermediate humidifier liquid outlet and is recirculated through a fluidic circuit comprising the intermediate humidifier liquid outlet, a first liquid inlet of the heating device, a first liquid outlet of the heating device, and the main humidifier liquid inlet. The remaining portion of the concentrated liquid stream may continue to flow through the humidifier, thereby becoming further concentrated, and may exit the humidifier through a main humidifier liquid outlet. In some embodiments, the humidifier may be fluidically connected to a dehumidifier (e.g., a bubble column condenser). The humidifier and dehumidifier may be used in water purification systems, such as desalination systems.

Previous humidification-dehumidification (HDH) systems were often operated with relatively high influent temperatures. That is to say, in such previous HDH systems, an influent liquid stream was often heated to a relatively high temperature (e.g., greater than about 90° C.) prior to being introduced into a humidifier of an HDH system in order to increase the efficiency and/or production rate of the HDH system. However, new humidifier and HDH systems and methods have been developed within the context of this invention that can, in certain cases, have relatively high operating efficiency and/or may be able to be operated effectively using relatively low liquid influent temperatures (e.g., less than about 90° C.).

Certain aspects relate to a humidifier system comprising a fluidic circuit comprising an intermediate liquid outlet of a humidifier, a first liquid inlet of a heating device, a first liquid outlet of the heating device, and a main liquid inlet of the humidifier. In some cases, recirculation of a liquid stream through the fluidic circuit may increase the liquid mass flow rate through a first stage of the humidifier and may compensate for the relatively low temperature of the influent liquid stream (e.g., a first liquid stream comprising a condensable fluid in liquid phase and a dissolved salt). For example, the operation of certain embodiments may be characterized by Equation 1:

$$\dot{m}_{liquid,i}\Delta T_{liquid,i}C=\dot{m}_{liquid,f}\Delta T_{liquid,f}C=\Delta \dot{H}_{gas}=\text{constant} \quad (1)$$

where $\dot{m}_{liquid,i}$ represents a first mass flow rate of the influent liquid stream (e.g., a first mass flow rate of the first liquid stream at the main humidifier liquid inlet), $\Delta T_{liquid,i}$ represents a first temperature change of the influent liquid stream across the first stage of the humidifier (e.g., the difference between the temperature of the first liquid stream at the main humidifier liquid inlet and the temperature of the first liquid stream at a liquid outlet of the first stage of the humidifier), C represents the heat capacity of the influent liquid stream, $\dot{m}_{liquid,f}$ represents a second mass flow rate of the influent liquid stream (e.g., a second mass flow rate of the first liquid stream at the main humidifier liquid inlet), $\Delta T_{liquid,f}$ represents a second temperature change of the influent liquid stream across the first stage of the humidifier, and $\Delta \dot{H}_{gas}$ represents the enthalpy rate change of a gas stream in thermal contact with the influent liquid stream. Equation 1 demonstrates that, for a liquid stream and a gas stream in thermal contact, an increase in liquid mass flow rate may compensate for a decrease in liquid temperature change such that the enthalpy rate change of the gas stream remains constant. For example, if the second temperature change of the influent liquid stream across the first humidifier stage is less than the first temperature change of the influent liquid stream across the first humidifier stage, the enthalpy rate change of the gas stream in thermal contact with the influent liquid stream may remain constant if the second mass flow rate of the influent liquid stream is greater than the first mass flow rate of the influent liquid stream. Accordingly, even if the influent liquid stream has a relatively low temperature, an increased liquid mass flow rate in the first stage of the humidifier may allow the enthalpy rate change of the gas stream to remain relatively constant. In some cases, temperature may be represented as a function of enthalpy, and a relatively constant change in enthalpy rate of the gas stream may indicate that the temperature change of the gas stream is also relatively constant. That is to say, the increased liquid mass flow rate may allow a sufficient amount of heat to be transferred from the influent liquid stream to the gas stream, such that the temperature of the gas stream is increased to a target temperature identified as resulting in optimal efficiency and/or production.

In some embodiments, removal of at least a portion of the liquid stream within the humidifier through an intermediate humidifier liquid outlet may isolate/mitigate the effect of the increased liquid mass flow rate, such that optimal thermal balancing is maintained in the humidifier without the need to substantially increase the size/capacity of the entire humidifier.

A system (e.g., an HDH system) with a relatively low influent temperature may be further advantageous, in some cases, because it may allow for operation of the system using low-grade heat (e.g., heat having a temperature of about 90° C. or less). In some cases, low-grade heat may be abundantly available at a relatively low cost (or, in certain cases, no cost). For example, low-grade heat may be available from natural heat sources, such as geothermal heat sources and solar radiation. In addition, many industrial processes (e.g., oil refining, metal refining) produce low-grade waste heat, and many cogeneration plants produce hot water or steam in addition to electricity. Even if conventional heating sources (e.g., furnaces) are used, it may be cheaper to obtain low-grade heat than high-temperature heat because, for example, due to reduced fuel costs associated with operating such heaters and/or the ability to operate conventional heating sources below the boiling point of a liquid being heated (e.g., a heating fluid), resulting in lower pressure requirements and lower associated capital and operating costs. In certain embodiments described, such low-grade heat sources may be used to heat an influent liquid stream prior to the stream entering the humidifier.

While embodiments of the invention may employ a variety of humidifier designs, including but not limited to those involving direct contact between gas and liquid streams, certain types of humidifiers may be associated with advantages over other types of humidifiers. For example, bubble column humidifiers may exhibit higher thermodynamic efficiency than certain other types of humidifiers (e.g., certain packed bed humidifiers, spray towers, wetted wall towers). Without wishing to be bound by a particular theory, the increased thermodynamic efficiency of bubble column humidifiers may be at least partially attributed to the use of gas bubbles for heat and mass transfer, since gas bubbles may have more surface area available for heat and mass transfer than many other types of surfaces (e.g., typical packing material). As described in further detail below, a bubble column humidifier may have certain features that further increase thermodynamic efficiency, including, but not limited to, relatively low liquid level height, relatively high aspect ratio liquid flow paths, and multi-staged designs. In certain cases, bubble column humidifiers may be particularly well-suited for certain of the presently described systems due to the relatively high rates of heat and mass transfer that may be attainable with certain of those humidifiers.

FIG. 1 is a schematic diagram of an exemplary system 100 comprising humidifier 102 and heating device 104. As shown in FIG. 1, humidifier 102 comprises a plurality of stages 102A-102E, including first stage 102A, last stage 102E, and intermediate stages 102B-102D. A first liquid inlet 122 of heating device 104 comprises or is fluidically connected to an intermediate liquid outlet 128 of humidifier 102 and a main liquid outlet 130 of humidifier 102. In addition, a first liquid outlet 124 of heating device 104 comprises or is fluidically connected to a main liquid inlet 126 of humidifier 102. In some cases, heating device 104 may also be fluidically connected to a source of a liquid stream comprising a condensable fluid in liquid phase and a dissolved salt (not shown in FIG. 1).

In operation, heating device 104 may receive a first liquid stream 106 comprising a condensable fluid in liquid phase and a dissolved salt through first liquid inlet 122. Within heating device 104, first liquid stream 106 may be heated to produce heated first liquid stream 108. Heated first liquid stream 108 may then be directed to flow from first liquid outlet 124 of heating device 104 to main liquid inlet 126 of humidifier 102. In some cases, the temperature of heated first liquid stream 108 at main liquid inlet 126 of humidifier 102 is relatively low (e.g., about 90° C. or less). Upon entering first humidifier stage 102A, which comprises or is fluidically connected (e.g., directly fluidically connected) to main liquid inlet 126 of humidifier 102, heated first liquid stream 108 may come into contact within humidifier 102 with gas stream 112, which may comprise a non-condensable gas. Gas stream 112 may enter humidifier 102 through main humidifier gas inlet 132 that is fluidically connected (e.g., directly fluidically connected) to last humidifier stage 102E and may flow through humidifier 102 from last humidifier stage 102E to first humidifier stage 102A.

In first humidifier stage 102A, heat and mass may be transferred from heated first liquid stream 108 to gas stream 112 (e.g., via an evaporation process), thereby producing a cooled, concentrated liquid stream enriched in the dissolved salt relative to heated first liquid stream 108 and a heated, at least partially humidified gas stream enriched in the condensable fluid in vapor phase relative to gas stream 112 received in the main humidifier gas inlet. The heated, at least partially humidified gas stream may exit humidifier 102 through a main humidifier gas outlet as vapor-containing humidifier gas outlet stream 114. An extracted liquid stream 110 comprising at least a portion of the cooled, concentrated liquid stream may exit humidifier 102 through intermediate humidifier liquid outlet 128 and may be directed to flow to first liquid inlet 122 of heating device 104. The remaining portion of the cooled, concentrated liquid stream may continue to flow through humidifier 102 from first humidifier stage 102A to last humidifier stage 102E, thereby becoming further cooled and concentrated (i.e., enriched in the dissolved salt). The cooled, concentrated liquid stream may exit humidifier 102 as humidifier liquid outlet stream 116 through main humidifier liquid outlet 130 in fluidic communication with (e.g., directly fluidically connected to) last humidifier stage 102E.

In certain embodiments, at least a portion 118 of humidifier liquid outlet stream 116 is discharged from system 100. In certain cases, the discharge rate of at least a portion of humidifier liquid outlet stream 116 may be selected to maintain a steady-state system salinity. In some embodiments, all of humidifier liquid outlet stream 116 is discharged from system 100. In some embodiments, at least a portion 120 of humidifier liquid outlet stream 116 remains within system 100 and is combined with extracted liquid stream 110 and additional influent liquid (e.g., first liquid stream 106) before being returned to heating device 104 and recirculated to humidifier 102.

According to some embodiments, a heating device may heat an influent liquid stream (e.g., a first liquid stream comprising a condensable fluid in liquid phase and a dissolved salt) to a relatively low temperature (e.g., about 90° C. or less), and the heated influent liquid stream may enter a humidifier at a relatively low temperature. In some embodiments, the temperature of an influent liquid stream entering the humidifier at a main humidifier liquid inlet (e.g., a liquid inlet directly fluidically connected to a first humidifier stage) is about 90° C. or less, about 80° C. or less, about 70° C. or less, about 60° C. or less, about 50° C. or less, about 40° C. or less, or about 30° C. or less. In certain embodiments, the temperature of an influent liquid stream entering the humidifier at a main humidifier liquid inlet is in the range of about 30° C. to about 50° C., about 30° C. to about 60° C., about 30° C. to about 70° C., about 30° C. to about 80° C., about 30° C. to about 90° C., about 40° C. to about 60° C., about 40° C. to about 70° C., about 40° C. to about 80° C., about 40° C. to about 90° C., about 50° C. to about 70° C., about 50° C. to about 80° C., about 50° C. to about 90° C., about 60° C. to about 80° C., about 60° C. to about 90° C., or about 70° C. to about 90° C. The temperature of the influent liquid stream may be measured at the main humidifier liquid inlet according to any method known in the art. For example, the temperature may be measured using one or more thermocouples (e.g., Type K thermocouples).

In some embodiments, an extracted liquid stream (e.g., a stream comprising at least a portion of a cooled, concentrated liquid stream) exits the humidifier through an intermediate humidifier liquid outlet. As used herein, an intermediate humidifier liquid outlet refers to a liquid outlet of a first stage or an intermediate stage of a humidifier comprising at least three stages. In certain embodiments, the location of extraction is selected such that the temperature of the extracted liquid stream differs with respect to the temperature of an influent liquid stream entering a heating device (e.g., a first liquid stream comprising a condensable fluid in liquid phase and a dissolved salt, a pre-heated first liquid stream) by only a relatively small amount. In some embodiments, the temperature difference is about 10° C. or less, about 5° C. or less, about 2° C. or less, or about 1° C. or less. In certain embodiments, the temperature difference is in the range of about 0° C. to about 10° C., about 0° C. to about 5° C., about 0° C. to about 2° C., or about 0° C. to about 1° C.

The extracted liquid stream may exit the humidifier at a certain flow rate selected to optimize the thermal efficiency of the humidifier. For example, in certain embodiments in which the temperature of the liquid stream entering the humidifier is relatively low, the flow rate of the extracted liquid stream may be adjusted (e.g., increased or decreased) to maintain an optimal temperature of the gas stream and the liquid stream exiting the first humidifier stage.

In some cases, the optimal temperature of the gas stream and/or liquid stream flowing through the humidifier refers to the temperature(s) at which the heat capacity rate ratio (HCR) of the humidifier approaches one. In some embodiments, the HCR of the humidifier may be calculated according to Equation 2:

$$HCR = \left(\frac{\Delta \dot{H}_{max,c}}{\Delta \dot{H}_{max,h}}\right) \quad (2)$$

where the numerator, $\Delta \dot{H}_{max,c}$, is the maximum enthalpy rate change of a cold stream flowing through the humidifier (e.g., the gas stream) and the denominator, $\Delta \dot{H}_{max,h}$, is the maximum enthalpy rate change of a hot stream flowing through the humidifier (e.g., the liquid stream). In the case of a dehumidifier, the cold stream would refer to a liquid stream flowing through the dehumidifier, and the hot stream would refer to a gas stream flowing through the dehumidifier. The maximum enthalpy rate change of a stream refers to the enthalpy rate change that would occur if the stream reached, at the main humidifier outlet, the inlet temperature of the other stream. For example, the maximum enthalpy rate change of the hot stream (e.g., the liquid stream in the humidifier) can be approximated according to Equation 1 as the product of the mass flow rate of the influent liquid stream at the main humidifier liquid inlet, the heat capacity of the liquid, and the difference between the temperature of the influent liquid stream at the main humidifier liquid inlet and the temperature of the influent gas stream at the main humidifier gas inlet. The maximum enthalpy rate change of the cold stream (e.g., the gas stream in the humidifier) can be approximated as the difference between the enthalpy rate of the gas stream at the main humidifier gas inlet (the product of the mass flow rate of the influent gas stream at the main humidifier gas inlet, the specific heat capacity of the gas at the temperature and humidity ratio of the influent gas stream at the main humidifier gas inlet, and the temperature of the influent gas stream at the main humidifier gas inlet) and the enthalpy rate of the gas stream at the main humidifier gas outlet (the product of the mass flow rate of the influent gas stream at the main humidifier gas inlet, the specific heat capacity of the gas at the temperature of the influent liquid stream at the main humidifier liquid inlet and the saturated humidity ratio at that temperature, and the temperature of the influent liquid stream at the main humidifier liquid inlet). In certain cases, the temperature(s) and/or flow rate(s) of the liquid and/or gas streams flowing through the humidifier are selected such that the HCR is between about 0.5 and about 1.5, between about 0.6 and about 1.4, between about 0.7 and about 1.3, between about 0.8 and about 1.2, between about 0.9 and about 1.1, or between about 0.95 and about 1.05.

According to some embodiments, the extracted liquid stream exits the humidifier through an intermediate humidifier liquid outlet at a lower flow rate than the humidifier liquid outlet stream exits the humidifier through the main humidifier liquid outlet. In certain embodiments, the flow rate of the extracted liquid stream at the intermediate humidifier liquid outlet is at least about 5%, at least about 10%, at least about 20%, at least about 25%, at least about 30%, at least about 40%, or at least about 50% of the flow rate of the humidifier liquid outlet stream at the main humidifier liquid outlet. In some embodiments, the flow rate of the extracted liquid stream at the intermediate humidifier liquid outlet is about 50% or less, about 40% or less, about 30% or less, about 25% or less, about 20% or less, about 10% or less, or about 5% or less of the flow rate of the humidifier liquid outlet stream at the main humidifier liquid outlet. In some embodiments, the flow rate of the extracted liquid stream at the intermediate humidifier liquid outlet is between about 5% and about 10%, about 5% and about 20%, about 5% and about 25%, about 5% and about 30%, about 5% and about 40%, about 5% and about 50%, about 10% and about 20%, about 10% and about 25%, about 10% and about 30%, about 10% and about 40%, about 10% and about 50%, about 20% and about 30%, about 20% and about 40%, about 20% and about 50%, about 25% and about 40%, about 25% and about 50%, about 30% and about 40%, about 30% and about 50%, or about 40% and about 50% of the flow rate of the humidifier liquid outlet stream at the main humidifier liquid outlet. The flow rate of the extracted liquid stream at the intermediate humidifier liquid outlet and the flow rate of the humidifier liquid outlet stream at the main humidifier liquid outlet may be measured according to any suitable method known in the art. For example, the flow rates may be measured using one or more flow meters (e.g., paddle wheel flow meters, rotameters, ultrasonic flow meters, mass flow meters).

According to some embodiments, the extracted liquid stream exits the humidifier through the intermediate humidifier liquid outlet at a higher flow rate than the humidifier liquid outlet stream exits the humidifier through the main humidifier liquid outlet. In certain embodiments, the flow rate of the extracted liquid stream at the intermediate humidifier liquid outlet is at least about 105%, at least about 110%, at least about 120%, at least about 125%, at least about 130%, at least about 140%, or at least about 150% of the flow rate of the humidifier liquid outlet stream at the main humidifier liquid outlet. In some embodiments the flow rate of the extracted liquid stream at the intermediate humidifier liquid outlet is about 150% or less, about 140% or less, about 130% or less, about 125% or less, about 120% or less, about 110% or less, or about 105% or less of the flow rate of the humidifier liquid outlet stream at the main humidifier liquid outlet. In some embodiments, the flow rate of the extracted liquid stream at the intermediate humidifier liquid outlet is between about 105% and about 110%, about 105% and about 120%, about 105% and about 125%, about 105% and about 130%, about 105% and about 140%, about 105% and about 150%, about 110% and about 120%, about 110% and about 125%, about 110% and about 130%, about 110% and about 140%, about 110% and about 150%, about 120% and about 130%, about 120% and about 140%, about 120% and about 150%, about 125% and about 140%, about 125% and about 150%, about 130% and about 140%, about 130% and about 150%, or about 140% and about 150% of the flow rate of the humidifier liquid outlet stream at the main humidifier liquid outlet.

Figure 3A:
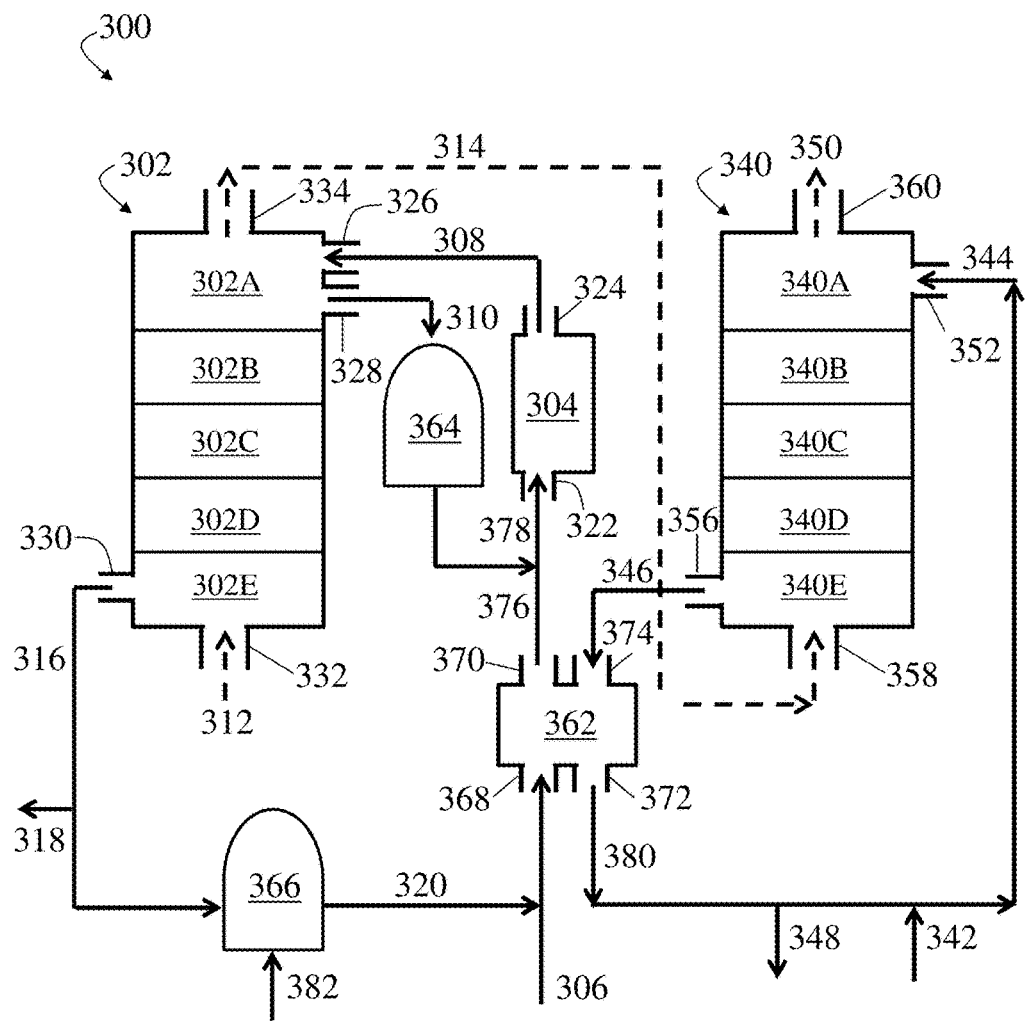
FIG. 3A shows, according to some embodiments, a schematic diagram of an exemplary system comprising a multi-stage humidifier, a multi-stage dehumidifier, a heating device, a heat exchanger, a first tank, and a second tank, where a first liquid outlet of the heat exchanger is fluidically connected to a first liquid inlet of the heating device.

In certain embodiments comprising a desalination system that has the exemplary configuration illustrated in FIG. 3A and that is configured to produce about 800 barrels of substantially pure water per day, the extracted liquid stream has a flow rate at the intermediate humidifier liquid outlet of at least about 30 gpm, at least about 40 gpm, at least about 50 gpm, at least about 100 gpm, at least about 150 gpm, at least about 200 gpm, at least about 250 gpm, at least about 300 gpm, at least about 350 gpm, at least about 400 gpm, at least about 450 gpm, at least about 500 gpm, at least about 550 gpm, or at least about 600 gpm. In certain embodiments, the extracted liquid stream has a flow rate at the intermediate humidifier liquid outlet in the range of about 30 gpm to about 50 gpm, about 30 gpm to about 100 gpm, about 30 gpm to about 150 gpm, about 30 gpm to about 200 gpm, about 30 gpm to about 300 gpm, about 30 gpm to about 400 gpm, about 30 gpm to about 500 gpm, about 30 gpm to about 600 gpm, about 50 gpm to about 100 gpm, about 50 gpm to about 200 gpm, about 50 gpm to about 300 gpm, about 50 gpm to about 400 gpm, about 50 gpm to about 500 gpm, about 50 gpm to about 600 gpm, about 100 gpm to about 200 gpm, about 100 gpm to about 300 gpm, about 100 gpm to about 400 gpm, about 100 gpm to about 500 gpm, about 100 gpm to about 600 gpm, about 200 gpm to about 600 gpm, about 300 gpm to about 600 gpm, about 400 gpm to about 600 gpm, or about 500 gpm to about 600 gpm.

In some embodiments, the extracted liquid stream may recirculate through a fluidic circuit comprising the intermediate humidifier liquid outlet, a first liquid inlet of a heating device, a first liquid outlet of the heating device, and a main humidifier liquid inlet. In certain cases, amounts of liquid may be added or removed from the fluidic circuit to control the salinity of the recirculating liquid stream. For example, the amount of liquid recirculating through the fluidic circuit may be adjusted (e.g., increased or decreased) by increasing or decreasing extraction and/or injection flow rates at various points throughout the fluidic circuit. In some cases, liquid replacement in the fluidic circuit may be substantially continuous, discontinuous (e.g., batch), or semi-discontinuous (e.g., semi-batch).

In some embodiments, the heating device is configured to receive a first liquid stream comprising a condensable fluid in liquid phase containing a dissolved salt. A condensable fluid generally refers to a fluid that is able to convert from liquid phase to vapor phase under at least one set of operating conditions within the humidifier. Non-limiting, illustrative examples of suitable condensable fluids include water, ammonia, benzene, toluene, ethyl benzene, alcohols, and/or combinations thereof. In addition to the condensable fluid in liquid phase, the first liquid stream may further comprise one or more additional liquids (e.g., the liquid stream may be a liquid mixture). A dissolved salt generally refers to a salt that has been solubilized to such an extent that the component ions (e.g., an anion, a cation) of the salt are no longer ionically bonded to each other. Non-limiting examples of dissolved salts that may be present in the first liquid stream include sodium chloride (NaCl), sodium bromide (NaBr), potassium chloride (KCl), potassium bromide (KBr), ammonium chloride ($NH_4Cl$), calcium chloride ($CaCl_2$), magnesium chloride ($MgCl_2$), sodium carbonate ($Na_2CO_3$), sodium bicarbonate ($NaHCO_3$), potassium bicarbonate ($KHCO_3$), sodium sulfate ($Na_2SO_4$), potassium sulfate ($K_2SO_4$), calcium sulfate ($CaSO_4$), magnesium sulfate ($MgSO_4$), strontium sulfate ($SrSO_4$), barium sulfate ($BaSO_4$), barium-strontium sulfate ($BaSr(SO_4)_2$), calcium nitrate ($Ca(NO_3)_2$), iron (III) hydroxide ($Fe(OH)_3$), iron (III) carbonate ($Fe_2(CO_3)_3$), aluminum hydroxide ($Al(OH)_3$), aluminum carbonate ($Al_2(CO_3)_3$), ammonium carbonate, ammonium bicarbonate, ammonium sulfate, boron salts, polyacrylic acid sodium salts, and/or silicates.

In certain embodiments, the first liquid stream comprises salt-containing water (e.g., water comprising one or more dissolved salts). In certain cases, the salt-containing water comprises seawater, brackish water, water produced form an oil and/or gas extraction process, flowback water, and/or wastewater (e.g., industrial wastewater). Non-limiting examples of wastewater include textile mill wastewater, leather tannery wastewater, paper mill wastewater, cooling tower blowdown water, flue gas desulfurization wastewater, landfill leachate water, and/or the effluent of a chemical process (e.g., the effluent of another desalination system and/or chemical process).

In some embodiments, the first liquid stream has a relatively high concentration of the dissolved salt. In certain embodiments, the concentration of the dissolved salt in the first liquid stream is at least about 1,000 mg/L, at least about 5,000 mg/L, at least about 10,000 mg/L, at least about 50,000 mg/L, at least about 100,000 mg/L, at least about 150,000 mg/L, at least about 200,000 mg/L, at least about 250,000 mg/L, at least about 300,000 mg/L, at least about 350,000 mg/L, or at least about 375,000 mg/L (and/or, in certain embodiments, up to the solubility limit of the dissolved salt in the liquid stream). In some embodiments, the concentration of the dissolved salt in the first liquid stream is in the range of about 1,000 mg/L to about 10,000 mg/L, about 1,000 mg/L to about 50,000 mg/L, about 1,000 mg/L to about 100,000 mg/L, about 1,000 mg/L to about 150,000 mg/L, about 1,000 mg/L to about 200,000 mg/L, about 1,000 mg/L to about 250,000 mg/L, about 1,000 mg/L to about 300,000 mg/L, about 1,000 mg/L to about 350,000 mg/L, about 1,000 mg/L to about 375,000 mg/L, about 10,000 mg/L to about 50,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 375,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 375,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 375,000 mg/L, about 150,000 mg/L to about 200,000 mg/L, about 150,000 mg/L to about 250,000 mg/L, about 150,000 mg/L to about 300,000 mg/L, about 150,000 mg/L to about 350,000 mg/L, about 150,000 mg/L to about 375,000 mg/L, about 200,000 mg/L to about 250,000 mg/L, about 200,000 mg/L to about 300,000 mg/L, about 200,000 mg/L to about 350,000 mg/L, about 200,000 mg/L to about 375,000 mg/L, about 250,000 mg/L to about 300,000 mg/L, about 250,000 mg/L to about 350,000 mg/L, about 250,000 mg/L to about 375,000 mg/L, about 300,000 mg/L to about 350,000 mg/L, or about 300,000 mg/L to about 375,000 mg/L. The concentration of a dissolved salt generally refers to the combined concentrations of the cation and the anion of the salt. For example, the concentration of dissolved NaCl would refer to the sum of the concentration of sodium ions ($Na^+$) and the concentration of chloride ions ($Cl^-$). The concentration of the dissolved salt may be measured according to any suitable method known in the art. For example, methods for measuring the concentration of the dissolved salt include inductively coupled plasma (ICP) spectroscopy (e.g., inductively coupled plasma optical emission spectroscopy). As one non-limiting example, an Optima 8300 ICP-OES spectrometer may be used.

In some embodiments, the first liquid stream contains the dissolved salt in an amount of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the dissolved salt in the first liquid stream). In some embodiments, the first liquid stream comprises the dissolved salt in an amount in the range of about 1 wt % to about 30 wt %, about 5 wt % to about 30 wt %, about 10 wt % to about 30 wt %, about 15 wt % to about 30 wt %, about 20 wt % to about 30 wt %, about 25 wt % to about 30 wt %, about 26 wt % to about 30 wt %, about 27 wt % to about 30 wt %, about 28 wt % to about 30 wt %, or about 29 wt % to about 30 wt %.

The heating device may be any device that is capable of transferring heat to a fluid stream. In some embodiments, the heating device comprises a first liquid inlet and a first liquid outlet. In certain cases, the heating device comprises a first fluidic pathway. The first liquid inlet of the heating device may be a liquid inlet of the first fluidic pathway, and the first liquid outlet of the heating device may be a liquid outlet of the first fluidic pathway. In some embodiments, the first liquid inlet of the heating device is fluidically connected to a source of a first liquid stream comprising a condensable fluid in liquid phase and a dissolved salt. In some embodiments, the first liquid inlet of the heating device comprises or is fluidically connected to an intermediate humidifier liquid outlet of the humidifier. In certain embodiments, the first liquid outlet of the first heating device comprises or is fluidically connected to a main liquid inlet of the humidifier.

In some embodiments, the heating device is a heat exchanger. The heating device may be any type of heat exchanger known in the art. In some cases, the heat exchanger comprises a first fluidic pathway and a second fluidic pathway. A first fluid stream may flow through the first fluidic pathway, and a second fluid stream may flow through the second fluidic pathway. The first fluid stream and the second fluid stream may be in direct or indirect contact, and heat may be transferred between the first fluid stream and the second fluid stream. In some embodiments, the first fluid stream and the second fluid stream are only in indirect contact. In certain embodiments, the second fluid stream comprises a heating fluid. The heating fluid may be any fluid capable of absorbing and transferring heat. Non-limiting examples of suitable heating fluids include water, air, saturated/superheated steam, synthetic organic-based non-aqueous fluids, glycol, brines, and/or mineral oils.

In some embodiments, a first fluid stream flows through the first fluidic pathway in a first direction, and a second fluid stream flows through the second fluidic pathway in a second direction that is substantially opposite from the first direction (e.g., counter flow), substantially the same as the first direction (e.g., parallel flow), or substantially perpendicular to the first direction (e.g., cross flow). In certain cases, a counter-flow heat exchanger may be more efficient than other types of heat exchangers. In some embodiments, the heating device is a counter-flow heat exchanger. In some embodiments, more than two fluid streams may flow through the heat exchanger.

In some embodiments, the first fluid stream flowing through the first fluidic pathway of the heating device and/or the second fluid stream flowing through the second fluidic pathway of the heating device are liquid streams, and the heating device is a liquid-to-liquid heat exchanger. In other embodiments, the first fluid stream flowing through the first fluidic pathway of the heating device and/or the second fluid stream flowing through the second fluidic pathway of the heating device are gas streams. In some embodiments, the first fluid stream and/or second fluid stream do not undergo a phase change (e.g., liquid to gas or vice versa) within the heating device.

Examples of suitable heat exchangers include, but are not limited to, plate-and-frame heat exchangers, shell-and-tube heat exchangers, tube-and-tube heat exchangers, plate heat exchangers, plate-and-shell heat exchangers, and the like. In a particular, non-limiting embodiment, the heating device is a plate-and-frame heat exchanger.

In some embodiments, the heat exchanger may exhibit relatively high heat transfer rates. In some embodiments, the heat exchanger may have a heat transfer coefficient of at least about 150 $W/(m^2\ K)$, at least about 200 $W/(m^2\ K)$, at least about 500 $W/(m^2\ K)$, at least about 1000 $W/(m^2\ K)$, at least about 2000 $W/(m^2\ K)$, at least about 3000 $W/(m^2\ K)$, at least about 4000 $W/(m^2\ K)$, at least about 5000 $W/(m^2\ K)$, at least about 6000 $W/(m^2\ K)$, at least about 7000 $W/(m^2\ K)$, at least about 8000 $W/(m^2\ K)$, at least about 9000 $W/(m^2\ K)$, or at least about 10,000 $W/(m^2\ K)$. In some embodiments, the heat exchanger may have a heat transfer coefficient in the range of about 150 $W/(m^2\ K)$ to about 10,000 $W/(m^2\ K)$, about 200 $W/(m^2\ K)$ to about 10,000 $W/(m^2\ K)$, about 500 $W/(m^2\ K)$ to about 10,000 $W/(m^2\ K)$, about 1000 $W/(m^2\ K)$ to about 10,000 $W/(m^2\ K)$, about 2000 $W/(m^2\ K)$ to about 10,000 $W/(m^2\ K)$, about 3000 $W/(m^2\ K)$ to about 10,000 $W/(m^2\ K)$, about 4000 $W/(m^2\ K)$ to about 10,000 $W/(m^2\ K)$, about 5000 $W/(m^2\ K)$ to about 10,000 $W/(m^2\ K)$, about 6000 $W/(m^2\ K)$ to about 10,000 $W/(m^2\ K)$, about 7000 $W/(m^2\ K)$ to about 10,000 W/(m² K), about 8000 W/(m² K) to about 10,000 W/(m² K), or about 9000 W/(m² K) to about 10,000 W/(m² K).

In some embodiments, the heating device is a heat collection device. The heat collection device may be configured to produce and/or store and/or utilize thermal energy (e.g., in the form of combustion of natural gas, solar energy, waste heat from a power plant, or waste heat from combusted exhaust). In certain cases, the heating device is configured to convert electrical energy to thermal energy. For example, the heating device may be an electric heater. In some embodiments, the heating device comprises a furnace (e.g., a combustion furnace).

The heating device may, in some cases, increase the temperature of one or more fluid streams flowing through (or otherwise in contact with) the heating device. For example, the difference between the temperature of a fluid stream entering the heating device and the fluid stream exiting the heating device may be at least about 5° C., at least about 10° C., at least about 15° C., at least about 20° C., at least about 30° C., at least about 40° C., or at least about 50° C. In some embodiments, the difference between the temperature of a fluid stream entering the heating device and the fluid stream exiting the heating device may be in the range of about 5° C. to about 10° C., about 5° C. to about 15° C., about 5° C. to about 20° C., about 5° C. to about 30° C., about 5° C. to about 40° C., about 5° C. to about 50° C., about 10° C. to about 20° C., about 10° C. to about 30° C., about 10° C. to about 40° C., about 10° C. to about 50° C., about 20° C. to about 30° C., about 20° C. to about 40° C., or about 20° C. to about 50° C. In some cases, the temperature of a fluid stream (e.g., a first fluid stream) being heated in the heating device remains below the boiling point of the fluid stream.

In some embodiments, the first heating device utilizes low-grade heat (e.g., heat having a temperature of about 90° C. or less) to increase the temperature of the fluid stream. In certain cases, for example, low-grade heat may be obtained from industrial processes, cogeneration plants, geothermal heat sources, solar radiation, combustion engines (e.g., diesel generator cooling jackets), power plant cooling water, oil refineries, metallurgy processes (e.g., titanium refining), and/or conventional heat sources.

The humidifier may be any type of humidifier known in the art. In some embodiments, the humidifier is configured to receive a liquid stream comprising a condensable fluid in liquid phase and a dissolved salt (e.g., a heated first liquid stream received from the heating device). In some embodiments, the humidifier is also configured to receive a gas stream via at least one humidifier gas inlet (e.g., a main humidifier gas inlet, an intermediate humidifier gas inlet). In some cases, the gas comprises at least one non-condensable gas. A non-condensable gas generally refers to a gas that cannot be condensed from gas phase to liquid phase under the operating conditions of the humidifier. Examples of suitable non-condensable gases include, but are not limited to, air, nitrogen, oxygen, helium, argon, carbon monoxide, carbon dioxide, sulfur oxides ($SO_X$) (e.g., $SO_2$, $SO_3$), nitrogen oxides ($NO_X$) (e.g., NO, $NO_2$), and/or a combination thereof. In some embodiments, the gas is a gas mixture (e.g., the gas comprises at least one non-condensable gas and one or more additional gases).

In the humidifier, the gas stream may come into contact (e.g., direct or indirect contact) with the heated first liquid stream exiting the heating device. In some embodiments, the temperature of the heated first liquid stream is higher than the temperature of the gas stream. According to some embodiments, upon contact of the gas stream and the heated first liquid stream within the humidifier, an amount of heat and at least a portion of the condensable fluid in the liquid are transferred from the heated first liquid stream to the gas stream via an evaporation (e.g., humidification) process, thereby producing a vapor-containing humidifier gas outlet stream and a cooled, concentrated liquid stream. In some embodiments, the vapor-containing humidifier gas outlet stream comprises a vapor mixture (e.g., a mixture of the condensable fluid in vapor phase and the non-condensable gas). In certain cases, the condensable fluid is water, and the vapor-containing humidifier gas outlet stream is enriched in water vapor relative to the gas stream received from the main humidifier gas inlet. In some embodiments, the cooled, concentrated liquid stream has a higher concentration of the dissolved salt than the heated first liquid stream (e.g., the cooled, concentrated liquid stream is enriched in the dissolved salt relative to the heated first liquid stream).

In some embodiments, the humidifier is configured such that a main liquid inlet is positioned at a first end (e.g., a top end) of the humidifier, and a main gas inlet is positioned at a second, opposite end (e.g., a bottom end) of the humidifier. The humidifier may also comprise a main liquid outlet at the second end of the humidifier and a main gas outlet at the first end of the humidifier. Such a configuration may facilitate the flow of a liquid stream (e.g., the heated first liquid stream) in a first direction through the humidifier from the main liquid inlet to the main liquid outlet and the flow of a gas stream in a second, substantially opposite direction through the humidifier from the main gas inlet to the main gas outlet, which may advantageously result in high thermal efficiency. In addition, the humidifier may comprise at least one intermediate humidifier liquid outlet and/or at least one intermediate humidifier liquid inlet. In certain embodiments, the humidifier may further comprise at least one intermediate humidifier gas outlet and/or at least one intermediate humidifier gas inlet.

In certain embodiments, the humidifier comprises a plurality of stages (e.g., the humidifier is a multi-stage humidifier). In some embodiments, the plurality of stages comprises a first stage, a last stage, and one or more intermediate stages positioned between the first stage and the last stage. As used herein, the first humidifier stage refers to the first stage of the humidifier encountered by a liquid stream entering the humidifier through the main liquid inlet. The first humidifier stage is, therefore, generally the stage of the humidifier positioned in closest proximity to the main humidifier liquid inlet. In some embodiments, the first humidifier stage comprises or is fluidically connected (e.g., directly fluidically connected) to the main humidifier liquid inlet (e.g., the main humidifier liquid inlet is a liquid inlet of the first humidifier stage). As used herein, the last humidifier stage refers to the last stage of the humidifier encountered by a liquid stream flowing through the humidifier. The last humidifier stage is, therefore, generally the stage of the humidifier positioned in closest proximity to the main humidifier liquid outlet. In some embodiments, the last humidifier stage comprises or is fluidically connected (e.g., directly fluidically connected) to the main humidifier liquid outlet (e.g., the main humidifier liquid outlet is a liquid outlet of the last humidifier stage). In some embodiments, in addition to the main humidifier liquid outlet fluidically connected to the last humidifier stage, the humidifier may comprise an intermediate humidifier liquid outlet. As used herein, an intermediate humidifier liquid outlet refers to a liquid outlet of the first stage or one of the one or more intermediate stages of the plurality of stages of the humidifier. In the humidifier, the plurality of stages may be vertically arranged (e.g., the first stage may be positioned above the last stage) or horizontally arranged (e.g., the first stage may be positioned to the left or right of the last stage).

The humidifier may have any number of stages. In some embodiments, the humidifier has at least one, at least two, at least three, at least four, at least five, at least six, at least seven, at least eight, at least nine, or at least ten or more stages. In some embodiments, the humidifier has 1-10 stages, 2-10 stages, 3-10 stages, 4-10 stages, 5-10 stages, 6-10 stages, 7-10 stages, 8-10 stages, or 9-10 stages. In some embodiments, the stage are arranged such that they are substantially parallel to each other. In certain cases, the stages are positioned at an angle.

In some embodiments, the humidifier further comprises a gas distribution chamber positioned between the main humidifier gas inlet and the plurality of stages. In certain embodiments, such as those embodiments in which the humidifier comprises a plurality of vertically-arranged stages, the gas distribution chamber is positioned at or near the bottom portion of the humidifier. In some embodiments, the gas distribution chamber comprises or is fluidically connected (e.g., directly fluidically connected) to the main humidifier gas inlet. The gas distribution chamber may have sufficient volume to allow a gas stream (e.g., a gas stream comprising a non-condensable gas) to substantially evenly diffuse over the cross section of the humidifier.

In some cases, the gas distribution chamber further comprises a liquid layer (e.g., a liquid sump volume). For example, liquid (e.g., comprising the condensable fluid in liquid phase and a dissolved salt) may collect in the liquid sump volume after exiting the last stage of the humidifier. In some cases, the liquid sump volume comprises or is fluidically connected (e.g., directly fluidically connected) to the main humidifier liquid outlet of the humidifier. In certain embodiments, the liquid sump volume is in fluid communication with a pump that pumps liquid out of the humidifier. The liquid sump volume may, for example, provide a positive suction pressure on the intake of the pump, and may advantageously prevent negative (e.g., vacuum) suction pressure that could induce deleterious cavitation bubbles. In some cases, the liquid sump volume may advantageously decrease the sensitivity of the humidifier to changes in flow rate, salinity, temperature, and/or heat transfer rate.

According to some embodiments, the humidifier is configured to facilitate direct contact between a liquid stream and a gas stream. In some embodiments, the humidifier is a bubble column humidifier. As noted above, a bubble column humidifier may be associated with certain advantages over other types of humidifiers, such as increased thermal efficiency. In some embodiments, at least one stage of the bubble column humidifier comprises a bubble generator. In certain embodiments, the bubble generator may act as a gas inlet for the at least one stage. In operation, the at least one stage of the bubble column humidifier may further comprise a liquid layer comprising an amount of a condensable fluid in liquid phase and a dissolved salt (e.g., at least a portion of a heated first liquid stream).

In some embodiments, the at least one stage may further comprise a vapor distribution region positioned adjacent the liquid layer (e.g., above the liquid layer). The vapor distribution region refers to the space within the stage throughout which vapor is distributed (e.g., the portion of the stage not occupied by the liquid layer). The vapor distribution region may, in certain cases, advantageously damp out flow variations created by random bubbling by allowing a gas to redistribute evenly across the cross section of the humidifier. Additionally, in the free space of the vapor distribution region, large droplets entrained in the gas may have some space to fall back into the liquid layer before the gas enters the subsequent stage. In some embodiments, the vapor distribution region is positioned between two liquid layers of two consecutive stages. The vapor distribution region may serve to separate the two consecutive stages, thereby increasing the thermodynamic effectiveness of the humidifier by keeping the liquid layers of each stage separate. In some embodiments, each stage of a plurality of stages of the bubble column humidifier comprises a bubble generator, a liquid layer, and a vapor distribution region positioned adjacent the liquid layer.

In some embodiments, a humidifier gas inlet stream (e.g., a gas stream comprising a non-condensable gas) enters the bubble column humidifier through a main humidifier gas inlet, and a humidifier liquid inlet stream (e.g., a heated first liquid stream) enters the bubble column humidifier through a main humidifier liquid inlet. The humidifier gas inlet stream may flow through the bubble generator of the at least one stage of the humidifier, thereby forming a plurality of gas bubbles. In some cases, the gas bubbles flow through the liquid layer of the at least one stage of the humidifier. As the gas bubbles directly contact the liquid layer, which may have a higher temperature than the gas bubbles, heat and/or mass (e.g., the condensable fluid) may be transferred from the liquid layer to the gas bubbles through an evaporation (e.g., humidification) process, thereby forming a heated, at least partially humidified humidifier gas outlet stream (e.g., a vapor-containing humidifier gas outlet stream) and a humidifier liquid outlet stream (e.g., a cooled, concentrated liquid stream) having a higher concentration of the dissolved salt than the humidifier liquid inlet stream. In certain embodiments, the condensable fluid is water, and the humidifier gas outlet stream is enriched in water vapor relative to the humidifier gas inlet stream received from the main humidifier gas inlet. In some embodiments, bubbles of the heated, at least partially humidified gas exit the liquid layer and recombine in the vapor distribution region, and the heated, at least partially humidified gas is substantially evenly distributed throughout the vapor distribution region. The vapor-containing humidifier gas outlet stream may exit the bubble column humidifier through the main humidifier gas outlet, and the humidifier liquid outlet stream may exit the bubble column humidifier through the main humidifier liquid outlet.

In some embodiments, the bubble column humidifier comprises a plurality of stages, and one or more stages of the plurality of stages comprise a liquid layer comprising an amount of a condensable fluid in liquid phase and a dissolved salt (e.g., at least a portion of a heated first liquid stream). In some embodiments relating to multi-stage bubble column humidifiers, the temperature of a liquid layer of a first stage (e.g., the topmost stage in a vertically arranged humidifier) may be higher than the temperature of a liquid layer of a second stage (e.g., a stage positioned below the first stage in a vertically arranged humidifier), which may be higher than the temperature of a liquid layer of a third stage (e.g., a stage positioned below the second stage in a vertically arranged humidifier). In some embodiments, each stage in a multi-stage bubble column humidifier operates at a temperature below that of the previous stage (e.g., the stage above it, in embodiments comprising vertically arranged humidifiers).

The presence of multiple stages within the bubble column humidifier may, in some cases, advantageously result in increased humidification of a gas stream. For example, the presence of multiple stages may provide numerous locations where the gas may be humidified. That is, the gas may travel through more than one liquid layer in which at least a portion of the gas undergoes evaporation (e.g., humidification). In addition, the presence of multiple stages within the bubble column humidifier may advantageously enable greater flexibility for fluid flow (e.g., extraction and/or injection of liquid streams and/or gas streams from intermediate humidifier stages).

It should be noted that the inventive systems and methods described herein are not limited to those including a bubble column humidifier and that other types of humidifiers may be used in some embodiments. For example, in certain embodiments, the humidifier is a packed bed humidifier. In certain cases, the humidifier comprises a packing material (e.g., polyvinyl chloride (PVC) packing material). The packing material may, in some cases, facilitate turbulent gas flow and/or enhanced direct contact between the liquid stream comprising a condensable fluid in liquid phase and at least one dissolved salt and the gas stream within the humidifier. In certain embodiments, the humidifier further comprises a device configured to produce droplets of the liquid stream. For example, a nozzle or other spraying device may be positioned at the top of the humidifier such that the liquid stream is sprayed downward to the bottom of the humidifier. The use of a spraying device can advantageously increase the degree of contact between the liquid stream fed to the humidifier and the gas stream into which water from the liquid stream is transported.

In some embodiments, the humidifier (e.g., the bubble column humidifier) is configured to have a relatively high evaporation rate. In certain cases, for example, the humidifier has an evaporation rate of at least about 500 barrels/day, at least about 600 barrels/day, at least about 700 barrels/day, at least about 800 barrels/day, at least about 900 barrels/day, at least about 1,000 barrels a day, at least about 1,100 barrels/day, at least about 1,200 barrels/day, at least about 1,300 barrels/day, at least about 1,400 barrels/day, at least about 1,500 barrels/day, at least about 2,000 barrels/day, at least about 3,000 barrels/day, at least about 4,000 barrels/day, or at least about 5,000 barrels/day. In some embodiments, the humidifier has an evaporation rate of about 500 barrels/day to about 5,000 barrels/day, about 600 barrels/day to about 5,000 barrels/day, about 700 barrels/day to about 5,000 barrels/day, about 800 barrels/day to about 5,000 barrels/day, about 900 barrels/day to about 5,000 barrels/day, about 1,000 barrels/day to about 5,000 barrels/day, about 1,100 barrels/day to about 5,000 barrels/day, about 1,200 barrels/day to about 5,000 barrels/day, about 1,300 barrels/day to about 5,000 barrels/day, about 1,400 barrels/day to about 5,000 barrels/day, about 1,500 barrels/day to about 5,000 barrels/day, about 2,000 barrels/day to about 5,000 barrels/day, about 3,000 barrels/day to about 5,000 barrels/day, or about 4,000 barrels/day to about 5,000 barrels/day. The evaporation rate of the humidifier may be obtained by measuring the total liquid output volume of the humidifier (e.g., the volume of all humidifier liquid outlet streams) over a time period (e.g., one day) and subtracting the input volume of the humidifier (e.g., the volume of all humidifier liquid inlet streams, such as the heated first liquid stream) over the same time period.

According to some embodiments, the humidifier liquid outlet stream has a relatively high concentration of the dissolved salt. In certain embodiments, the concentration of the dissolved salt (e.g., NaCl) in the humidifier liquid outlet stream is at least about 1,000 mg/L, at least about 5,000 mg/L, at least about 10,000 mg/L, at least about 50,000 mg/L, at least about 100,000 mg/L, at least about 150,000 mg/L, at least about 200,000 mg/L, at least about 250,000 mg/L, at least about 300,000 mg/L, at least about 350,000 mg/L, at least about 400,000 mg/L, at least about 450,000 mg/L, or at least about 500,000 mg/L (and/or, in certain embodiments, up to the solubility limit of the dissolved salt in the liquid stream). In some embodiments, the concentration of the dissolved salt in the humidifier liquid outlet stream is in the range of about 1,000 mg/L to about 10,000 mg/L, about 1,000 mg/L to about 50,000 mg/L, about 1,000 mg/L to about 100,000 mg/L, about 1,000 mg/L to about 150,000 mg/L, about 1,000 mg/L to about 200,000 mg/L, about 1,000 mg/L to about 250,000 mg/L, about 1,000 mg/L to about 300,000 mg/L, about 1,000 mg/L to about 350,000 mg/L, about 1,000 mg/L to about 400,000 mg/L, about 1,000 mg/L to about 450,000 mg/L, about 1,000 mg/L to about 500,000 mg/L, about 10,000 mg/L to about 50,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 400,000 mg/L, about 10,000 mg/L to about 450,000 mg/L, about 10,000 mg/L to about 500,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 mg/L to about 500,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, or about 100,000 mg/L to about 500,000 mg/L.

In some embodiments, the humidifier liquid outlet stream contains the dissolved salt in an amount of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the dissolved salt in the humidifier liquid outlet stream). In some embodiments, the humidifier liquid outlet stream comprises the dissolved salt in an amount in the range of about 1 wt % to about 30 wt %, about 5 wt % to about 30 wt %, about 10 wt % to about 30 wt %, about 15 wt % to about 30 wt %, about 20 wt % to about 30 wt %, about 25 wt % to about 30 wt %, about 26 wt % to about 30 wt %, about 27 wt % to about 30 wt %, about 28 wt % to about 30 wt %, or about 29 wt % to about 30 wt %.

In some embodiments, the concentration of the dissolved salt in the humidifier liquid outlet stream is substantially greater than the concentration of the dissolved salt in the humidifier liquid inlet stream (e.g., heated first liquid stream). In some cases, the concentration of the dissolved salt in the humidifier liquid outlet stream is at least about 0.5%, about 1%, about 2%, about 5%, about 10%, about 15%, or about 20% greater than the concentration of the dissolved salt in the humidifier liquid inlet stream.

Figure 2:
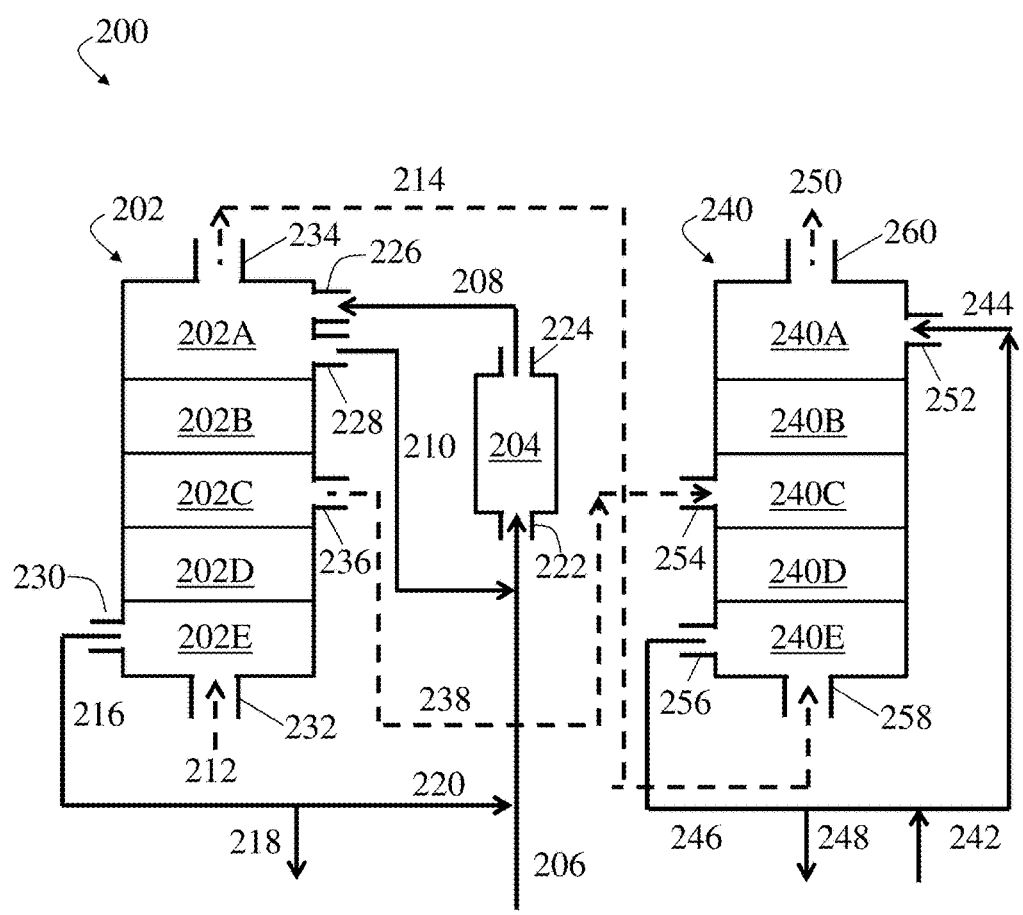
FIG. 2 shows a schematic diagram of an exemplary system comprising a multi-stage humidifier, a multi-stage dehumidifier, and a heating device, according to some embodiments.

In some embodiments, the system further comprises a dehumidifier (e.g., a bubble column condenser) fluidically connected to the humidifier. FIG. 2 illustrates an exemplary system comprising a dehumidifier. As shown in FIG. 2, system 200 comprises humidifier 202, heating device 204, and dehumidifier 240. Humidifier 202 comprises a plurality of stages comprising first stage 202A, last stage 202E, and intermediate stages 202B-202D positioned between first stage 202A and last stage 202E. Dehumidifier 240 comprises a plurality of stages comprising first stage 240A, last stage 240E, and intermediate stages 240B-240D positioned between first stage 240A and last stage 240E. A main humidifier gas outlet 234 of humidifier 202 may be fluidically connected to a main dehumidifier gas inlet 258 of dehumidifier 240. Optionally, an intermediate gas outlet 236 of humidifier 202 may be fluidically connected to an intermediate dehumidifier gas inlet 254 of dehumidifier 240. For example, FIG. 2 shows intermediate humidifier stage 202C as being fluidically connected to intermediate dehumidifier stage 240C. It should be noted, however, that if humidifier 202 comprises an intermediate gas outlet, the intermediate gas outlet of humidifier 202 may be a gas outlet of any intermediate stage of humidifier 202 (e.g., any one of intermediate stages 202B-202D), and if dehumidifier 240 comprises an intermediate gas inlet, the intermediate gas inlet of dehumidifier 240 may be a gas inlet of any intermediate stage of dehumidifier 240 (e.g., any one of intermediate stages 240B-240D). In addition, a main dehumidifier gas outlet 250 of dehumidifier 240 may optionally be fluidically connected to a main humidifier gas inlet 232 of humidifier 202 (fluidic connection not shown in FIG. 2). A first liquid inlet 222 of heating device 204 may be fluidically connected to an intermediate humidifier liquid outlet 228 of humidifier 202 and/or a main humidifier liquid outlet 230 of humidifier 202. A first liquid outlet 224 of heating device 204 may be fluidically connected to a main humidifier liquid inlet 226 of humidifier 202.

In operation, humidifier 202 and heating device 204 may be operated similarly to humidifier 102 and heating device 104, which were described in relation to FIG. 1. In addition, vapor-containing humidifier gas outlet stream 214 may be directed to flow to dehumidifier 240 and may enter dehumidifier 240 through main dehumidifier gas inlet 258 fluidically connected to last dehumidifier stage 240E. In certain embodiments, a partially humidified gas stream 238 may also be directed to flow from intermediate humidifier gas outlet 236 fluidically connected to an intermediate humidifier stage (e.g., intermediate humidifier stage 202C) to intermediate dehumidifier gas inlet 254 fluidically connected to an intermediate dehumidifier stage (e.g., intermediate dehumidifier stage 240C). A condensable liquid stream 224 comprising an amount of the condensable fluid in liquid phase may enter dehumidifier 240 through main dehumidifier liquid inlet 252 fluidically connected to first dehumidifier stage 240A. Condensable liquid stream 244 may flow in a first direction through dehumidifier 240 from first stage 240A to last stage 240E, and vapor-containing humidifier gas outlet stream 214 may flow through dehumidifier 240 in a second direction through dehumidifier 240 from last stage 240E to first stage 240A. Within dehumidifier 240, heat and mass may be transferred from vapor-containing humidifier gas outlet stream 214 to condensable liquid stream 244 (e.g., through a condensation process), thereby producing a cooled, at least partially dehumidified gas stream and an amount of heated condensable liquid that is added to condensable liquid stream 244. Condensable liquid stream 244 may exit dehumidifier 240 through main dehumidifier liquid outlet 256 as dehumidifier liquid outlet stream 246. In some cases, at least a portion 248 of dehumidifier liquid outlet stream 246 is discharged from system 200. In some cases, at least a portion 244 of dehumidifier liquid outlet stream 246 is returned to dehumidifier 240 through main dehumidifier liquid inlet 252. The cooled, at least partially dehumidified gas stream may exit dehumidifier 240 through main dehumidifier gas outlet 260 as dehumidifier gas outlet stream 250. In some cases, at least a portion of dehumidifier gas outlet stream 250 may be discharged from system 200 (e.g., by being vented into the atmosphere as waste exhaust). In some cases, at least a portion of dehumidifier gas outlet stream 250 is directed to flow to main gas inlet 232 of humidifier 202 (fluidic connection not shown in FIG. 2).

The dehumidifier may be any type of dehumidifier known in the art. In some embodiments, the dehumidifier is configured to receive a vapor-containing humidifier gas outlet stream (e.g., a heated, at least partially humidified gas stream) as a dehumidifier gas inlet stream. The dehumidifier may also be configured to receive a condensable liquid stream (e.g., a liquid stream comprising the condensable fluid in liquid phase) as a dehumidifier liquid inlet stream. In some embodiments, the dehumidifier liquid inlet stream comprises water. In certain cases, the dehumidifier liquid inlet stream comprises substantially pure water (e.g., water having a relatively low dissolved salt concentration).

In the dehumidifier, the dehumidifier gas inlet stream (e.g., the vapor-containing humidifier gas outlet stream) may come into contact (e.g., direct or indirect contact) with the dehumidifier liquid inlet stream (e.g., the condensable liquid stream). The dehumidifier gas inlet stream may have a higher temperature than the dehumidifier liquid inlet stream, and upon contact of the dehumidifier gas inlet stream and the dehumidifier liquid inlet stream, heat and/or mass may be transferred from the dehumidifier gas inlet stream to the dehumidifier liquid inlet stream. In certain embodiments, the dehumidifier gas inlet stream comprises the condensable fluid in vapor phase and a non-condensable gas, and at least a portion of the condensable fluid is transferred from the dehumidifier gas inlet stream to the dehumidifier liquid inlet stream via a condensation (e.g., dehumidification) process, thereby producing a dehumidifier liquid outlet stream comprising the condensable fluid in liquid phase and an at least partially dehumidified dehumidifier gas outlet stream. In certain cases, the condensable fluid is water, and the dehumidifier gas outlet stream is lean in water vapor relative to the dehumidifier gas inlet stream (e.g., the vapor-containing humidifier gas outlet stream). In some embodiments, the dehumidifier liquid outlet stream comprises substantially pure water. In certain cases, the dehumidifier liquid outlet stream comprises water in the amount of at least about 95 wt %, at least about 99 wt %, at least about 99.9 wt %, or at least about 99.99 wt % (and/or, in certain embodiments, up to about 99.999 wt %, or more).

In some embodiments, the dehumidifier is configured such that a main liquid inlet is positioned at a first end (e.g., a top end) of the dehumidifier, and a main gas inlet is positioned at a second, opposite end (e.g., a bottom end) of the dehumidifier. The dehumidifier may also comprise a main liquid outlet at the second end of the dehumidifier and a main gas outlet at the first end of the dehumidifier. Such a configuration may facilitate the flow of a liquid stream (e.g., the dehumidifier liquid inlet stream) in a first direction through the dehumidifier from the main liquid inlet to the main liquid outlet and the flow of a gas stream (e.g., the vapor-containing humidifier gas outlet stream) in a second, substantially opposite direction through the dehumidifier from the main gas inlet to the main gas outlet, which may advantageously result in high thermal efficiency. In addition, the dehumidifier may comprise at least one intermediate dehumidifier liquid outlet and/or at least one intermediate dehumidifier liquid inlet. In certain embodiments, the dehumidifier may further comprise at least one intermediate dehumidifier gas outlet and/or at least one intermediate dehumidifier gas inlet.

In certain embodiments, the dehumidifier comprises a plurality of stages (e.g., the dehumidifier is a multi-stage dehumidifier). In some embodiments, the plurality of stages comprises a first stage, a last stage, and one or more intermediate stages positioned between the first stage and the last stage. As used herein, the first dehumidifier stage refers to the first stage of the dehumidifier encountered by a liquid stream entering the dehumidifier through the main liquid inlet. The first dehumidifier stage is, therefore, generally the stage of the dehumidifier positioned in closest proximity to the main dehumidifier liquid inlet. In some embodiments, the first dehumidifier stage is fluidically connected (e.g., directly fluidically connected) to the main dehumidifier liquid inlet (e.g., the main dehumidifier liquid inlet is a liquid inlet of the first dehumidifier stage). As used herein, the last dehumidifier stage refers to the last stage of the dehumidifier encountered by a liquid stream flowing through the dehumidifier. The last dehumidifier stage is, therefore, generally the stage of the dehumidifier positioned in closest proximity to the main dehumidifier liquid outlet. In some embodiments, the last dehumidifier stage is fluidically connected (e.g., directly fluidically connected) to the main dehumidifier liquid outlet (e.g., the main dehumidifier liquid outlet is a liquid outlet of the last dehumidifier stage). In some embodiments, in addition to the main dehumidifier liquid outlet fluidically connected to the last humidifier stage, the dehumidifier may comprise an intermediate dehumidifier liquid outlet. As used herein, an intermediate dehumidifier liquid outlet refers to a liquid outlet of the first stage or one of the one or more intermediate stages of the plurality of stages of the dehumidifier. In the dehumidifier, the plurality of stages may be vertically arranged (e.g., the first stage may be positioned above the last stage) or horizontally arranged (e.g., the first stage may be positioned to the left or right of the last stage).

The dehumidifier may have any number of stages. In some embodiments, the dehumidifier has at least one, at least two, at least three, at least four, at least five, at least six, at least seven, at least eight, at least nine, or at least ten or more stages. In some embodiments, the dehumidifier has 1-10 stages, 2-10 stages, 3-10 stages, 4-10 stages, 5-10 stages, 6-10 stages, 7-10 stages, 8-10 stages, or 9-10 stages. In some embodiments, the stages are arranged such that they are substantially parallel to each other. In certain cases, the stages are positioned at an angle.

In some embodiments, the dehumidifier further comprises a gas distribution chamber positioned between the main dehumidifier gas inlet and the plurality of stages. In certain embodiments, such as those embodiments in which the dehumidifier comprises a plurality of vertically-arranged stages, the gas distribution chamber is positioned at or near the bottom portion of the dehumidifier. In some embodiments, the gas distribution chamber is fluidically connected (e.g., directly fluidically connected) to the main dehumidifier gas inlet. The gas distribution chamber may have sufficient volume to allow a gas stream (e.g., a vapor-containing humidifier gas outlet stream) to substantially evenly diffuse over the cross section of the dehumidifier.

In some cases, the gas distribution chamber further comprises a liquid layer (e.g., a liquid sump volume). For example, liquid (e.g., comprising the condensable fluid in liquid phase) may collect in the liquid sump volume after exiting the last stage of the dehumidifier. In some cases, the liquid sump volume is fluidically connected (e.g., directly fluidically connected) to the main dehumidifier liquid outlet of the dehumidifier. In certain embodiments, the liquid sump volume is in fluid communication with a pump that pumps liquid out of the dehumidifier. The liquid sump volume may, for example, provide a positive suction pressure on the intake of the pump, and may advantageously prevent negative (e.g., vacuum) suction pressure that could induce deleterious cavitation bubbles. In some cases, the liquid sump volume may advantageously decrease the sensitivity of the dehumidifier to changes in flow rate, salinity, temperature, and/or heat transfer rate.

According to some embodiments, the dehumidifier is configured to facilitate direct contact between a liquid stream and a gas stream. In some embodiments, the dehumidifier is a bubble column condenser. As noted above, a bubble column condenser may be associated with certain advantages over other types of dehumidifiers, such as increased thermal efficiency. In some embodiments, at least one stage of the bubble column condenser comprises a bubble generator. In certain embodiments, the bubble generator may act as a gas inlet for the at least one stage. In operation, the at least one stage of the bubble column condenser may further comprise a liquid layer comprising an amount of a condensable fluid in liquid phase (e.g., at least a portion of a condensable liquid stream).

In some embodiments, the at least one stage may further comprise a vapor distribution region positioned adjacent the liquid layer (e.g., above the liquid layer). The vapor distribution region refers to the space within the stage throughout which vapor is distributed (e.g., the portion of the stage not occupied by the liquid layer). The vapor distribution region may, in certain cases, advantageously damp out flow variations created by random bubbling by allowing a gas to redistribute evenly across the cross section of the dehumidifier. Additionally, in the free space of the vapor distribution region, large droplets entrained in the gas may have some space to fall back into the liquid layer before the gas enters the subsequent stage. In some embodiments, the vapor distribution region is positioned between two liquid layers of two consecutive stages. The vapor distribution region may serve to separate the two consecutive stages, thereby increasing the thermodynamic effectiveness of the bubble column condenser by keeping the liquid layers of each stage separate. In some embodiments, each stage of a plurality of stages of the bubble column condenser comprises a bubble generator, a liquid layer, and a vapor distribution region positioned adjacent the liquid layer.

In some embodiments, the bubble column condenser is configured to receive a vapor-containing humidifier gas outlet stream (e.g., comprising a heated, at least partially humidified gas) through a main dehumidifier gas inlet as a dehumidifier gas inlet stream. The dehumidifier gas inlet stream may flow through the bubble generator of the at least one stage of the condenser, thereby forming a plurality of bubbles of the heated, at least partially humidified gas. In some cases, the gas bubbles flow through the liquid layer of the at least one stage of the condenser. As the gas bubbles directly contact the liquid layer, which may have a lower temperature than the gas bubbles, heat and/or mass (e.g., condensable fluid) may be transferred from the gas bubbles to the liquid layer via a condensation (e.g., dehumidification) process, thereby forming a cooled, at least partially dehumidified dehumidifier gas outlet stream and a dehumidifier liquid outlet stream comprising the condensable fluid in liquid phase. In certain embodiments, the condensable fluid is water, and the dehumidifier gas outlet stream is lean in water vapor relative to the dehumidifier gas inlet stream received from the main dehumidifier gas inlet. In some embodiments, bubbles of the cooled, at least partially dehumidified gas exit the liquid layer and recombine in the vapor distribution region, and the cooled, at least partially dehumidified gas is substantially evenly distributed throughout the vapor distribution region. The dehumidifier gas outlet stream may exit the bubble column condenser through the main dehumidifier gas outlet, and the dehumidifier liquid outlet stream may exit the bubble column condenser through the main dehumidifier liquid outlet.

In embodiments, the bubble column condenser comprises a plurality of stages, and one or more stages of the plurality of stages comprise a liquid layer comprising an amount of a condensable fluid in liquid phase. In some embodiments relating to multi-stage dehumidifiers, the temperature of a liquid layer of a first stage (e.g., the topmost stage in a vertically arranged dehumidifier) may be lower than the temperature of a liquid layer of a second stage (e.g., a stage positioned below the first stage in a vertically arranged dehumidifier), which may be lower than the temperature of a liquid layer of a third stage (e.g., a stage positioned below the second stage in a vertically arranged dehumidifier). In some embodiments, each stage in a multi-stage dehumidifier operates at a temperature above that of the previous stage (e.g., the stage above it, in embodiments comprising vertically arranged dehumidifiers).

The presence of multiple stages within the bubble column condenser may, in some cases, advantageously result in increased dehumidification of a gas stream. In some cases, the presence of multiple stages may advantageously lead to higher recovery of a condensable fluid in liquid phase. For example, the presence of multiple stages may provide numerous locations where the gas may be dehumidified (e.g., treated to recover the condensable liquid). That is, the gas may travel through more than one liquid layer in which at least a portion of the gas undergoes dehumidification (e.g., condensation). In addition, the presence of multiple stages may increase the difference in temperature between a liquid stream at an inlet and an outlet of a dehumidifier. For example, the use of multiple stages can produce a dehumidifier liquid outlet stream having increased temperature relative to the dehumidifier liquid inlet stream. This may be advantageous in systems where heat from a liquid stream (e.g., dehumidifier liquid outlet stream) is transferred to a separate stream (e.g., humidifier liquid inlet stream) within the system. In such cases, the ability to produce a heated dehumidifier liquid outlet stream can increase the energy effectiveness of the system. Additionally, the presence of multiple stages may enable greater flexibility for fluid flow within a system (e.g., extraction and/or injection of liquid streams and/or gas streams from intermediate dehumidifier stages).

It should be noted that the inventive systems and methods described herein are not limited to those including a bubble column condenser and that other types of dehumidifiers may be used in some embodiments. For example, the dehumidifier may be a surface condenser, a spray tower, or a packed bed tower. In certain cases, the dehumidifier may comprise a surface (e.g., a metal surface) in contact with a gas stream comprising a condensable fluid in vapor phase.

In some embodiments, the dehumidifier (e.g., bubble column condenser) is configured to have a relatively high condensation rate. In certain cases, for example, the dehumidifier has a condensation rate of at least about 500 barrels/day, at least about 600 barrels/day, at least about 700 barrels/day, at least about 800 barrels/day, at least about 900 barrels/day, at least about 1,000 barrels a day, at least about 1,100 barrels/day, at least about 1,200 barrels/day, at least about 1,300 barrels/day, at least about 1,400 barrels/day, at least about 1,500 barrels/day, at least about 2,000 barrels/day, at least about 3,000 barrels/day, at least about 4,000 barrels/day, or at least about 5,000 barrels/day. In some embodiments, the dehumidifier has a condensation rate of about 500 barrels/day to about 5,000 barrels/day, about 600 barrels/day to about 5,000 barrels/day, about 700 barrels/day to about 5,000 barrels/day, about 800 barrels/day to about 5,000 barrels/day, about 900 barrels/day to about 5,000 barrels/day, about 1,000 barrels/day to about 5,000 barrels/day, about 1,100 barrels/day to about 5,000 barrels/day, about 1,200 barrels/day to about 5,000 barrels/day, about 1,300 barrels/day to about 5,000 barrels/day, about 1,400 barrels/day to about 5,000 barrels/day, about 1,500 barrels/day to about 5,000 barrels/day, about 2,000 barrels/day to about 5,000 barrels/day, about 3,000 barrels/day to about 5,000 barrels/day, or about 4,000 barrels/day to about 5,000 barrels/day. The condensation rate of the dehumidifier may be obtained by measuring the total liquid output volume of the dehumidifier (e.g., the volume of all dehumidifier liquid outlet streams) over a time period (e.g., one day) and subtracting the input volume of the dehumidifier (e.g., the volume of all dehumidifier liquid inlet streams) over the time period.

According to some embodiments, the dehumidifier liquid outlet stream has a relatively low concentration of the dissolved salt. In certain embodiments, the concentration of the dissolved salt in the dehumidifier liquid outlet stream is about 500 mg/L or less, about 200 mg/L or less, about 100 mg/L or less, about 50 mg/L or less, about 20 mg/L or less, about 10 mg/L or less, about 5 mg/L or less, about 2 mg/L or less, about 1 mg/L or less, about 0.5 mg/L or less, about 0.2 mg/L or less, about 0.1 mg/L or less, about 0.05 mg/L or less, about 0.02 mg/L or less, or about 0.01 mg/L or less. In some cases, the concentration of the dissolved salt in the dehumidifier liquid outlet stream is substantially zero (e.g., not detectable). In certain cases, the concentration of the dissolved salt in the dehumidifier liquid outlet stream is in the range of about 0 mg/L to about 500 mg/L, about 0 mg/L to about 200 mg/L, about 0 mg/L to about 100 mg/L, about 0 mg/L to about 50 mg/L, about 0 mg/L to about 20 mg/L, about 0 mg/L to about 10 mg/L, about 0 mg/L to about 5 mg/L, about 0 mg/L to about 2 mg/L, about 0 mg/L to about 1 mg/L, about 0 mg/L to about 0.5 mg/L, about 0 mg/L to about 0.1 mg/L, about 0 mg/L to about 0.05 mg/L, about 0 mg/L to about 0.02 mg/L, or about 0 mg/L to about 0.01 mg/L.

In some embodiments, the dehumidifier liquid outlet stream contains the dissolved salt in an amount of about 2 wt % or less, about 1 wt % or less, about 0.5 wt % or less, about 0.2 wt % or less, about 0.1 wt % or less, about 0.05 wt % or less, or about 0.01 wt % or less. In some embodiments, the dehumidifier liquid outlet stream contains the dissolved salt in an amount in the range of about 0.01 wt % to about 2 wt %, about 0.01 wt % to about 1 wt %, about 0.01 wt % to about 0.5 wt %, about 0.01 wt % to about 0.2 wt %, or about 0.01 wt % to about 0.1 wt %.

In some embodiments, the concentration of the dissolved salt in the dehumidifier liquid outlet stream is substantially less than the concentration of the dissolved salt in the first liquid stream received by the system. In some cases, the concentration of the dissolved salt in the dehumidifier liquid outlet stream is at least about 0.5%, about 1%, about 2%, about 5%, about 10%, about 15%, or about 20% less than the concentration of the dissolved salt in the first liquid stream.

In some embodiments, the system (e.g., HDH system) has a relatively high production rate (e.g., amount of substantially pure water produced per unit time). In certain cases, the system has a production rate of at least about 500 barrels/day, at least about 600 barrels/day, at least about 700 barrels/day, at least about 800 barrels/day, at least about 900 barrels/day, at least about 1,000 barrels a day, at least about 1,100 barrels/day, at least about 1,200 barrels/day, at least about 1,300 barrels/day, at least about 1,400 barrels/day, at least about 1,500 barrels/day, at least about 2,000 barrels/day, at least about 3,000 barrels/day, at least about 4,000 barrels/day, or at least about 5,000 barrels/day. In some embodiments, the system has a production rate in the range of about 500 barrels/day to about 5,000 barrels/day, about 600 barrels/day to about 5,000 barrels/day, about 700 barrels/day to about 5,000 barrels/day, about 800 barrels/day to about 5,000 barrels/day, about 900 barrels/day to about 5,000 barrels/day, about 1,000 barrels/day to about 5,000 barrels/day, about 1,100 barrels/day to about 5,000 barrels/day, about 1,200 barrels/day to about 5,000 barrels/day, about 1,300 barrels/day to about 5,000 barrels/day, about 1,400 barrels/day to about 5,000 barrels/day, about 1,500 barrels/day to about 5,000 barrels/day, about 2,000 barrels/day to about 5,000 barrels/day, about 3,000 barrels/day to about 5,000 barrels/day, or about 4,000 barrels/day to about 5,000 barrels/day.

In some embodiments, the system further comprises a second heating device, which may be in the form of a heat exchanger. In certain cases, the second heating device/heat exchanger facilitates transfer of heat from a fluid stream exiting the dehumidifier (e.g., a dehumidifier liquid outlet stream) to a fluid stream entering the system (e.g., a first liquid stream) and/or a fluid stream recirculating through the system. For example, the second heating device/heat exchanger may advantageously allow energy to be recovered from a dehumidifier liquid outlet stream and be used to pre-heat an influent liquid stream prior to entry of the influent liquid stream into the heating device or the humidifier. The presence of the second heating device/heat exchanger to recover energy from the dehumidifier liquid outlet stream may, therefore, reduce the amount of heat required to be applied to the influent liquid stream. In some embodiments, the system can be configured such that the cooled dehumidifier liquid outlet stream can be returned to the dehumidifier through a main dehumidifier liquid inlet and be re-used as a liquid to form liquid layers in one or more stages of the dehumidifier.

FIG. 3A is a schematic diagram of an exemplary system comprising a second heat exchanger 362. In FIG. 3A, system 300 comprises humidifier 302, first heating device/heat exchanger 304, dehumidifier 340, and second heat exchanger 362. In addition, system 300 comprises optional first tank 364 and optional second tank 366. Humidifier 302 comprises a plurality of stages 302A-302E, and dehumidifier 340 comprises a plurality of stages 340A-340E.

In some cases, a flow path for a gas stream encompasses humidifier 302 and dehumidifier 340. A main humidifier gas outlet 334 of humidifier 302 is fluidically connected to a main dehumidifier gas inlet 358 of dehumidifier 340. In addition, a main dehumidifier gas outlet 360 of dehumidifier 340 is, optionally, fluidically connected to a main humidifier gas inlet 332 of humidifier 302.

In some cases, a main flow path for a liquid stream comprising a condensable fluid in liquid phase and a dissolved salt encompasses second heat exchanger 332, first heating device/heat exchanger 304, humidifier 302, and optional second tank 336. A first liquid inlet 368 of second heat exchanger 362 is fluidically connected to a source of a first liquid stream 306 comprising a condensable fluid in liquid phase and a dissolved salt. A first liquid outlet 370 of second heat exchanger 332 is fluidically connected to a first liquid inlet 322 of first heating device/heat exchanger 304. A first liquid outlet 324 of first heating device/heat exchanger 304 is fluidically connected to a main humidifier liquid inlet 326 of humidifier 302. A main humidifier liquid outlet 330 of humidifier 302 is fluidically connected to optional second tank 336, which is also fluidically connected to first liquid inlet 368 of second heat exchanger 362.

In some cases, a fluidic circuit for a recirculated liquid stream comprising a condensable fluid in liquid phase and a dissolved salt encompasses first heating device/heat exchanger 304, humidifier 302, and optional first tank 364. First liquid outlet 324 of first heating device/heat exchanger 304 is fluidically connected to main humidifier liquid inlet 326 of humidifier 302. Intermediate humidifier liquid outlet 328 of humidifier 302 is fluidically connected to optional first tank 364, which is fluidically connected to first liquid inlet 322 of heating device 304.

In some cases, a main flow path for a liquid stream comprising a condensable fluid in liquid phase encompasses dehumidifier 340 and second heat exchanger 332. Main dehumidifier liquid outlet 346 is fluidically connected to second liquid inlet 374 (e.g., a liquid inlet of a second fluidic pathway) of second heat exchanger 362. Second liquid outlet 374 of second heat exchanger 332 is fluidically connected to main dehumidifier liquid inlet 352 of dehumidifier 340.

In operation, first liquid stream 306 may enter second heat exchanger 362. Heat may be transferred from dehumidifier liquid outlet stream 346 to first liquid stream 306 to form pre-heated first liquid stream 376. Pre-heated first liquid stream 376 may exit heat exchanger 362 and be combined with at least a portion of one or more additional liquid streams (e.g., extracted liquid stream 310 exiting intermediate humidifier liquid outlet 328) to form combined stream 378. In some embodiments, the difference between the temperature of extracted liquid stream 310 and the temperature of pre-heated first liquid stream 376 may be relatively small (e.g., about 10° C. or less). Combined stream 378 may then enter first heating device/heat exchanger 304 through first liquid inlet 322. Within first heating device/heat exchanger 304, combined stream 378 may be heated to form heated combined stream 308. Heated combined stream 308 may enter first stage 302A of humidifier 302 through main humidifier liquid inlet 326.

A gas stream 312 may enter humidifier 302 through main humidifier gas inlet 332, which is fluidically connected to last stage 302E of humidifier 302. As gas stream 312 flows through humidifier 302 from last stage 302E to first stage 302A, heated combined stream 308 may simultaneously flow through humidifier 302 from first stage 302A to last stage 302E.

In first stage 302A of humidifier 302, heat and mass may be transferred from heated combined stream 308 to gas stream 312 (e.g., through an evaporation process), thereby forming a cooled, concentrated liquid stream and a heated, at least partially humidified gas stream. In some cases, the heated, at least partially humidified gas stream may exit humidifier 302 through main humidifier gas outlet 334 as vapor-containing humidifier gas outlet stream 314. In some cases, at least a portion of the cooled, concentrated liquid stream exits humidifier 302 through intermediate humidifier liquid outlet 328 as extracted liquid stream 310. As shown in FIG. 3A, extracted liquid stream 310 may be directed to flow to optional first tank 364. From optional first tank 364, at least a portion of extracted liquid stream 310 may then be combined with pre-heated first liquid stream 376 to form combined stream 378, which may be directed to flow to first liquid inlet 322 of first heating device/heat exchanger 304. Combined stream 378 may be heated within first heating device/heat exchanger 304 to produce heated combined stream 308, which may be directed to enter humidifier 302 through main humidifier gas inlet 326.

A liquid stream may recirculate through the fluidic circuit formed by first liquid inlet 322 of first heating device/heat exchanger 304, first liquid outlet 324 of first heating device/heat exchanger 304, main humidifier liquid inlet 326 of humidifier 302, intermediate humidifier liquid outlet 328 of humidifier 302, and optional first tank 364. In some cases, optional first tank 364 may provide the fluidic circuit with a thermal, physical, and concentrative buffer volume. In some embodiments, amounts of liquid may be added or removed (e.g., to control the salinity of the liquid stream recirculated through the fluidic circuit), for example by adjusting (e.g., increasing or decreasing) extraction and/or injection flow rates at various points throughout the fluidic circuit. In some cases, liquid replacement in the fluidic circuit may be substantially continuous, discontinuous (e.g., batch), or semi-discontinuous (e.g., semi-batch).

The remaining portion of the cooled, concentrated liquid stream that does not exit humidifier 302 through intermediate humidifier liquid outlet 328 as extracted liquid stream 310 may flow through the remainder of humidifier 302 and become further cooled and concentrated as gas stream 312 becomes correspondingly further heated and humidified. The cooled, concentrated liquid stream may exit humidifier 302 as humidifier liquid outlet stream 316.

In some cases, at least a portion 318 of humidifier liquid outlet stream 316 may be discharged from system 300. Portion 318 of humidifier liquid outlet stream 316 may be discharged in order, for example, to maintain a steady state system salinity. In some cases, all of humidifier liquid outlet stream 316 may be discharged from system 300. In certain cases, any remaining portion of humidifier liquid outlet stream 316 may flow to optional second tank 366. In some cases, the presence of optional second tank 366 in system 300 may reduce salinity and temperature fluctuations during regular operation due to providing additional system volume. In some cases, an additional influent stream 382 comprising the condensable fluid in liquid phase and a dissolved salt may enter optional second tank 366 (e.g., as a make-up stream). In some cases, a stream 320 comprising a remaining portion of humidifier liquid outlet stream 316 and/or a portion of additional influent stream 382 may be directed to flow from optional second tank 366 to first liquid inlet 368 of second heat exchanger 362.

After flowing through humidifier 302, the heated, humidified gas stream may exit humidifier 302 through main humidifier gas outlet 334 as vapor-containing humidifier gas outlet stream 314. Stream 314 may be directed to flow to main dehumidifier gas inlet 358 of dehumidifier 340. Stream 314 may flow through dehumidifier 340 in a direction from last stage 340E to first stage 340A, and condensable liquid stream 344 may simultaneously flow through dehumidifier 340 in a direction from first stage 340A to last stage 340E. As streams 314 and 344 flow through dehumidifier 340, heat and mass may be transferred from vapor-containing humidifier gas outlet stream 314 to condensable liquid stream 344 (e.g., through a condensation process), thereby forming a cooled, at least partially dehumidified gas stream. In addition, as condensable fluid condenses from vapor-containing humidifier gas outlet stream 314, amounts of heated condensable liquid may be added to condensable liquid stream 344.

The cooled, at least partially dehumidified gas stream may exit dehumidifier 340 through main dehumidifier gas outlet 360 as dehumidifier gas outlet stream 350. In some embodiments, at least a portion of dehumidifier gas outlet stream 350 is discharged from system 300 (e.g., vented into the environment as waste heat exhaust). In some embodiments, at least a portion of dehumidifier gas outlet stream 350 is directed to flow to main humidifier gas inlet 332 of humidifier 302.

The heated condensable liquid stream may exit dehumidifier 340 as dehumidifier liquid outlet stream 346. As shown in FIG. 3A, dehumidifier liquid outlet stream 346 may be directed to flow to second heat exchanger 362. In second heat exchanger 362, first liquid stream 306 may flow through a first fluidic pathway and dehumidifier liquid outlet stream 346 may flow through a second fluidic pathway, and heat may be transferred from dehumidifier liquid outlet stream 346 to first liquid stream 306. After flowing through the second fluidic pathway of heat exchanger 362, the cooled dehumidifier liquid outlet stream may exit second heat exchanger 362 as cooled stream 380. In some embodiments, at least a portion 348 of cooled stream 380 is discharged from system 300. In some embodiments, at least a portion of cooled stream 380 is returned to dehumidifier 340 as condensable liquid stream 344.

Figure 3B:
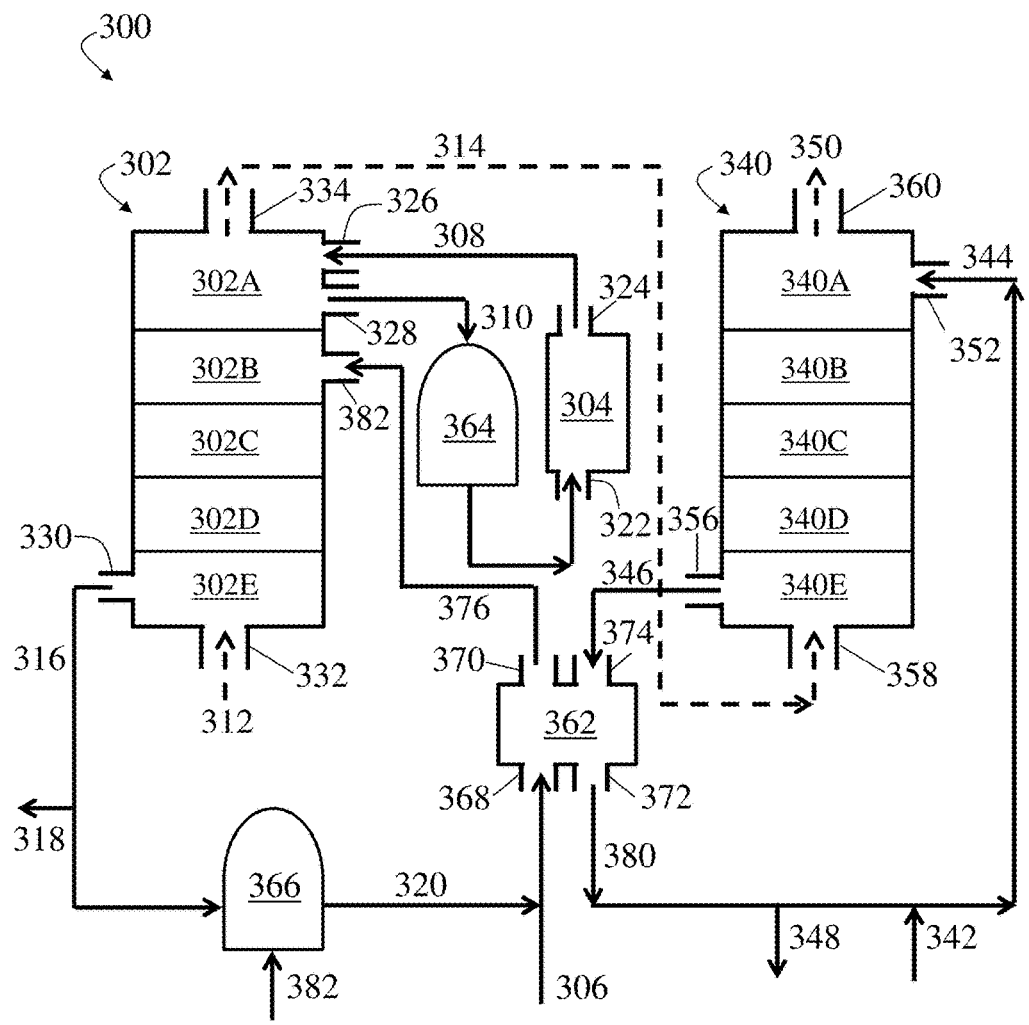
FIG. 3B shows, according to some embodiments, a schematic diagram of an exemplary system comprising a multi-stage humidifier, a multi-stage dehumidifier, a heating device, a heat exchanger, a first tank, and a second tank, where a first liquid outlet of the heat exchanger is fluidically connected to an intermediate liquid inlet of the humidifier.

In the system illustrated in FIG. 3A, some overlap exists between the fluidic circuit for the recirculated liquid stream (first heating device/heat exchanger 304, the portion of humidifier 302 between main humidifier liquid inlet 326 and intermediate humidifier liquid outlet 328, and optional first tank 364 in FIG. 3A) and the humidifier main flow path for the liquid stream comprising a condensable fluid in liquid phase and a dissolved salt (humidifier 302 from first humidifier stage 302A to last humidifier stage 302E, optional second tank 366, second heat exchanger 362, and first heating device/heat exchanger 304). In particular, both the recirculated liquid stream fluidic circuit and the humidifier main flow path include first liquid inlet 322 of first heating device/heat exchanger 304, first liquid outlet 324 of first heating device/heat exchanger 304, and main humidifier liquid inlet 326 of humidifier 302. In some embodiments, however, the recirculated liquid stream fluidic circuit and the humidifier main flow path are at least partially separated/isolated (e.g., such that humidifier liquid outlet stream 316 is not recirculated through all or any parts of the recirculated liquid stream fluidic circuit—see FIG. 3B). In certain cases, at least partially separating the recirculated liquid stream fluidic circuit and the humidifier main flow path may advantageously facilitate temperature and/or flow control. FIG. 3B is a schematic diagram of an exemplary system in which the fluidic circuit and the main flow path are separated.

System 300 in FIG. 3B comprises the same components (e.g., humidifier 302, dehumidifier 340, first heating device/heat exchanger 304, second heat exchanger 362) as in FIG. 3A. However, in system 300 of FIG. 3B, first liquid outlet 368 of second heat exchanger 362 is fluidically connected to intermediate humidifier liquid inlet 382 of stage 302B of humidifier 302 instead of first liquid inlet 322 of first heating device/heat exchanger 304. Intermediate humidifier liquid inlet 382 may be any liquid inlet of any one or more of the one or more intermediate stages of humidifier 302. As shown in FIG. 3B, the fluidic circuit through which a liquid stream recirculates comprises first liquid inlet 322 of first heating device/heat exchanger 304, first liquid outlet 324 of first heating device/heat exchanger 304, main humidifier liquid inlet 326 of humidifier 302, intermediate humidifier liquid outlet 328 of humidifier 302, and optional first tank 364. In contrast, the humidifier main flow path comprises first liquid inlet 368 of second heat exchanger 362, first liquid outlet 370 of second heat exchanger 362, intermediate humidifier liquid inlet 382 of humidifier 302, main humidifier liquid outlet 330 of humidifier 302, and optional second tank 366.

In operation, first liquid stream 306 may enter second heat exchanger 362 through first liquid inlet 368. As first liquid stream 306 flows through a first fluidic pathway of second heat exchanger 362, dehumidifier liquid outlet stream 346 may flow through a second fluidic pathway of second heat exchanger 362, and heat may be transferred from dehumidifier liquid outlet stream 346 to first liquid stream 306 to form pre-heated first liquid stream 376. Pre-heated first liquid stream 376 may then be directed to flow to intermediate liquid inlet 382 of humidifier 302 (e.g., a liquid inlet of intermediate humidifier stage 302B or 302C). After entering humidifier 302 through intermediate liquid inlet 382, pre-heated first liquid stream 376 may flow through humidifier 302 as previously described in relation to FIG. 3A.

Separately, an influent liquid stream comprising a condensable fluid in liquid phase and a dissolved salt may be introduced into first heating device/heat exchanger 304, and the influent stream may be heated to produce heated influent stream 308. Heated influent stream 308 may enter first stage 302A of humidifier 302 through main humidifier liquid inlet 326. In first stage 302A, heat and mass may be transferred from heated influent stream 308 to gas stream 312, thereby producing a cooled, concentrated liquid stream and a heated, at least partially humidified gas stream. The heated, at least partially humidified gas stream may exit humidifier 302 through main humidifier gas outlet 334 as vapor-containing humidifier gas outlet stream 314, which may be directed to flow to main dehumidifier gas inlet 358 of dehumidifier 340. At least a portion of the cooled, concentrated liquid stream may exit humidifier 302 as extracted liquid stream 310. In some cases, extracted liquid stream 310 may be directed to flow to optional first tank 364. From optional first tank 364, extracted liquid stream 310 may be returned to first heating device/heat exchanger 304.

In some embodiments, an amount of liquid may be added to or removed from the fluidic circuit. In some cases, for example, additional liquid may be added at an average rate approximately equal to the evaporation rate in first humidifier stage 302A. In certain cases, pre-heated first liquid stream 376 may be a source of the additional liquid. In some embodiments, an additional influent stream comprising the condensable fluid in liquid phase and a dissolved salt (not shown in FIG. 3B) may enter optional first tank 364 (e.g., as a make-up stream). In some embodiments, an amount of concentrated liquid may be removed from the fluidic circuit and replaced with liquid having a lower concentration of the dissolved salt (e.g., in order to control the salinity of the recirculated liquid stream). In some cases, the replacement may be continuous, discontinuous (e.g., batch), or semi-discontinuous (e.g., semi-batch).

The second heat exchanger (e.g., heat exchanger 362 in FIGS. 3A-3B) may be any type of heat exchanger known in the art. In some embodiments, the second heat exchanger comprises a first fluidic pathway and a second fluidic pathway, each comprising an inlet (e.g., a liquid inlet) and an outlet (e.g., a liquid outlet). As used herein, the first inlet and first outlet of the second heat exchanger refer to the inlet and outlet of the first fluidic pathway, respectively, and the second inlet and second outlet of the second heat exchanger refer to the inlet and outlet of the second fluidic pathway, respectively. In some embodiments, a first fluid stream may flow through the first fluidic pathway, and a second fluid stream may flow through the second fluidic pathway. The first fluid stream and the second fluid stream may be in direct or indirect contact, and heat may be transferred between the first fluid stream and the second fluid stream. In some embodiments, the first fluid stream and the second fluid stream are only in indirect contact.

In some embodiments, a first fluid stream flows through the first fluidic pathway in a first direction, and a second fluid stream flows through the second fluidic pathway in a second direction that is substantially opposite from the first direction (e.g., counter flow), substantially the same as the first direction (e.g., parallel flow), or substantially perpendicular to the first direction (e.g., cross flow). In certain cases, a counter-flow heat exchanger may be more efficient than other types of heat exchangers. In some embodiments, the second heat exchanger is a counter-flow heat exchanger. In some embodiments, more than two fluid streams may flow through the second heat exchanger.

In some embodiments, the first fluid stream flowing through the first fluidic pathway of the second heat exchanger and/or the second fluid stream flowing through the second fluidic pathway of the second heat exchanger are liquid streams. In certain embodiments, the heating device is a liquid-to-liquid heat exchanger. In some embodiments, the first fluid stream and/or second fluid stream do not undergo a phase change (e.g., liquid to gas) within the second heat exchanger. In certain embodiments, the first fluid stream is an influent liquid stream entering the system (e.g., a first liquid stream), and the second fluid stream is a liquid stream exiting the dehumidifier (e.g., a dehumidifier liquid outlet stream).

Examples of suitable heat exchangers include, but are not limited to, plate-and-frame heat exchangers, shell-and-tube heat exchangers, tube-and-tube heat exchangers, plate heat exchangers, plate-and-shell heat exchangers, spiral heat exchangers, and the like. In a particular embodiment, the heat exchanger is a plate-and-frame heat exchanger. A non-limiting example of a suitable commercially available heat exchanger is Plate Concepts Modu-Flex Plate & Frame Product # MFL041D1PA150-115.

In some embodiments, the second heat exchanger may exhibit relatively high heat transfer rates. In some embodiments, the second heat exchanger may have a heat transfer coefficient of at least about 150 $W/(m^2 K)$, at least about 200 $W/(m^2 K)$, at least about 500 $W/(m^2 K)$, at least about 1000 $W/(m^2 K)$, at least about 2000 $W/(m^2 K)$, at least about 3000 $W/(m^2 K)$, at least about 4000 $W/(m^2 K)$, or, in some cases, at least about 5000 $W/(m^2 K)$, at least about 6000 $W/(m^2 K)$, at least about 7000 $W/(m^2 K)$, at least about 8000 $W/(m^2 K)$, at least about 9000 $W/(m^2 K)$, or at least about 10,000 $W/(m^2 K)$. In some embodiments, the second heat exchanger may have a heat transfer coefficient in the range of about 150 $W/(m^2 K)$ to about 10,000 $W/(m^2 K)$, about 200 $W/(m^2 K)$ to about 10,000 $W/(m^2 K)$, about 500 $W/(m^2 K)$ to about 10,000 $W/(m^2 K)$, about 1000 $W/(m^2 K)$ to about 10,000 $W/(m^2 K)$, about 2000 $W/(m^2 K)$ to about 10,000 $W/(m^2 K)$, about 3000 $W/(m^2 K)$ to about 10,000 $W/(m^2 K)$, or about 4000 $W/(m^2 K)$ to about 10,000 $W/(m^2 K)$, about 5000 $W/(m^2 K)$ to about 10,000 $W/(m^2 K)$, about 6000 $W/(m^2 K)$ to about 10,000 $W/(m^2 K)$, about 7000 $W/(m^2 K)$ to about 10,000 $W/(m^2 K)$, about 8000 $W/(m^2 K)$ to about 10,000 $W/(m^2 K)$, or about 9000 $W/(m^2 K)$ to about 10,000 $W/(m^2 K)$.

The second heat exchanger may, in some cases, increase the temperature of one or more fluid streams flowing through the second heat exchanger. For example, the difference between the temperature of a fluid stream entering the second heat exchanger and the fluid stream exiting the second heat exchanger may be at least about 5° C., at least about 10° C., at least about 15° C., at least about 20° C., at least about 30° C., at least about 40° C., or at least about 50° C. In some embodiments, the difference between the temperature of a fluid stream entering the second heat exchanger and the fluid stream exiting the second heat exchanger may be in the range of about 5° C. to about 10° C., about 5° C. to about 15° C., about 5° C. to about 20° C., about 5° C. to about 30° C., about 5° C. to about 40° C., about 5° C. to about 50° C., about 10° C. to about 20° C., about 10° C. to about 30° C., about 10° C. to about 40° C., about 10° C. to about 50° C., about 20° C. to about 30° C., about 20° C. to about 40° C., or about 20° C. to about 50° C. In some cases, the temperature of a fluid stream (e.g., a first liquid stream) being heated in the second heat exchanger remains below the boiling point of the fluid stream.

In some embodiments, the second heat exchanger is an external heat exchanger (e.g., external to the humidifier and dehumidifier). In some cases, an external heat exchanger may be associated with certain advantages. For example, the use of an external heat exchanger with a humidifier and/or dehumidifier may advantageously allow the humidifier and/or dehumidifier to have reduced dimensions and/or reduced liquid layer heights within one or more stages.

In some embodiments, the second heat exchanger is an internal heat exchanger (e.g., internal to the humidifier or dehumidifier). For example, an internal heat exchanger may comprise a tube coil located within the dehumidifier. The tube coil may be positioned such that at least a portion of the tube coil is in thermal contact with a liquid layer within a stage of the dehumidifier. For example, in a dehumidifier (e.g., bubble column condenser) comprising a plurality of stages, each stage comprising a liquid layer, the tube coil may be positioned such that each liquid layer is in thermal contact with at least a portion of the tube coil. In some cases, a coolant (e.g., an influent liquid stream) may flow through the internal heat exchanger (e.g., the tube coil), and heat may be transferred from the liquid layer(s) of the dehumidifier to the coolant.

In some embodiments, the system further comprises an optional first tank. In certain embodiments, the optional first tank is fluidically connected (e.g., directly fluidically connected) to an intermediate humidifier liquid outlet. In certain embodiments, the optional first tank is fluidically connected (e.g., directly fluidically connected) to the first liquid inlet of the heating device. In some cases, the optional first tank forms part of a fluidic circuit through which a liquid stream (e.g., a stream comprising a condensable fluid in liquid phase and a dissolved salt) is recirculated. The optional first tank may provide the fluidic circuit with thermal, physical, and/or concentrative buffer volume, thereby reducing fluctuations (e.g., salinity and/or temperature fluctuations) during operation.

In some embodiments, the system further comprises an optional second tank. In certain embodiments, the optional second tank is fluidically connected (e.g., directly fluidically connected) to the main humidifier liquid outlet. In certain embodiments, the optional second tank is fluidically connected (e.g., directly fluidically connected) to the first liquid inlet of the heating device and/or the first liquid inlet of the second heat exchanger. In some cases, the optional second tank may increase system volume and provide the main flow path with thermal, physical, and/or concentrative buffer volume, thereby reducing fluctuations (e.g., salinity and/or temperature fluctuations) during operation.

The first tank and second tank may be any type of tank known in the art and may comprise any vessel capable of holding a volume of a liquid. The first tank and second tank may also have any size. In some embodiments, the first tank and/or second tank have a volume of at least about 100 gallons, at least about 250 gallons, at least about 500 gallons, at least about 750 gallons, at least about 1,000 gallons, at least about 2,000 gallons, at least about 5,000 gallons, or at least about 10,000 gallons. In some embodiments, the first tank and/or second tank have a volume in the range of about 100 gallons to about 250 gallons, about 100 gallons to about 500 gallons, about 100 gallons to about 750 gallons, about 100 gallons to about 1,000 gallons, about 100 gallons to about 2,000 gallons, about 100 gallons to about 5,000 gallons, or about 100 gallons to about 10,000 gallons.

As noted above, the humidifier may be a bubble column humidifier and/or the dehumidifier may be a bubble column condenser. Accordingly, the humidifier and/or dehumidifier may comprise one or more bubble generators. The one or more bubble generators may have various features (e.g., holes) used for generation of bubbles. The selection of a bubble generator can affect the size and/or shape of the gas bubbles generated, thereby affecting heat and/or mass transfer between gas bubbles and a liquid layer of a humidifier or a dehumidifier. Appropriate bubble generator and/or bubble generator conditions (e.g., bubble generator speeds) may be selected to produce a particular desired set of gas bubbles. Non-limiting examples of suitable bubble generators include a sparger plate (e.g., a plate comprising a plurality of holes through which a gas can travel), a device comprising one or more perforated pipes (e.g., having a radial, annular, spider-web, or hub-and-spoke configuration), a device comprising one or more nozzles, porous media (e.g., microporous metal), and/or a device comprising bubble caps.

In certain embodiments, a bubble generator comprises a sparger plate. It has been recognized that a sparger plate may have certain advantageous characteristics. For example, the pressure drop across a sparger plate may be relatively low. Additionally, the simplicity of the sparger plate may render it inexpensive to manufacture and/or resistant to the effects of fouling. According to some embodiments, the sparger plate comprises a plurality of holes, at least a portion of which have a diameter (or maximum cross-sectional dimension for non-circular holes) in the range of about 0.1 mm to about 50 mm, about 0.1 mm to about 25 mm, about 0.1 mm to about 15 mm, about 0.1 mm to about 10 mm, about 0.1 mm to about 5 mm, about 0.1 mm to about 1 mm, about 1 mm to about 50 mm, about 1 mm to about 25 mm, about 1 mm to about 15 mm, about 1 mm to about 10 mm, or about 1 mm to about 5 mm. In certain embodiments, substantially all the holes of the plurality of holes have a diameter (or maximum cross-sectional dimension) in the range of about 0.1 mm to about 50 mm, about 0.1 mm to about 25 mm, about 0.1 mm to about 15 mm, about 0.1 mm to about 10 mm, about 0.1 mm to about 5 mm, about 0.1 mm to about 1 mm, about 1 mm to about 50 mm, about 1 mm to about 25 mm, about 1 mm to about 15 mm, about 1 mm to about 10 mm, or about 1 mm to about 5 mm. The holes may have any suitable shape. For example, at least a portion of the plurality of holes may be substantially circular, substantially elliptical, substantially square, substantially rectangular, substantially triangular, and/or irregularly shaped. In some embodiments, substantially all the holes of the plurality of holes are substantially circular, substantially elliptical, substantially square, substantially rectangular, substantially triangular, and/or irregularly shaped.

In some cases, the sparger plate may be arranged along the bottom surface of a stage within the humidifier and/or the dehumidifier. In some embodiments, the sparger plate may have a surface area that covers at least about 50%, at least about 60%, at least about 70%, at least about 80%, at least about 90%, at least about 95%, or about 100% of a cross-section of the humidifier and/or the dehumidifier.

In some cases, inlets and/or outlets within the humidifier and/or dehumidifier may be provided as separate and distinct structural elements/features. In some cases, inlets and/or outlets within the humidifier and/or dehumidifier may be provided by certain components such as the bubble generator and/or any other features that establish fluid communication between components of the humidifier and/or dehumidifier. For example, the "gas inlet" and/or "gas outlet" of a humidifier or a dehumidifier may be provided as a plurality of holes of a bubble generator (e.g., a sparger plate). In some embodiments, at least one bubble generator is coupled to a gas inlet of a stage of the humidifier and/or the dehumidifier. In some embodiments, a bubble generator is coupled to a gas inlet of each stage of the humidifier and/or dehumidifier.

In addition to one or more bubble generators, one or more stages of the humidifier (e.g., bubble column humidifier) and/or dehumidifier (e.g., bubble column condenser) may comprise a liquid layer. In some cases, the composition of a liquid layer in a stage of the humidifier may be different from the composition of a liquid layer in a stage of the dehumidifier. For example, in the humidifier, the liquid layer may comprise a liquid comprising a condensable fluid in liquid phase and a dissolved salt. In the dehumidifier, the liquid layer may comprise the condensable fluid in liquid phase (e.g., water). In certain embodiments, a liquid layer of the dehumidifier comprises the condensable fluid in liquid phase in substantially purified form (e.g., having a relatively low level of contaminants, including dissolved salts). According to some embodiments, a liquid layer of the dehumidifier comprises substantially pure water.

In some embodiments, the height of the liquid layer in one or more stages of the humidifier and/or dehumidifier is relatively low during operation of the system (e.g., substantially continuous operation and/or substantially transient operation). In some cases, the height of a liquid layer within a stage can be measured vertically from the surface of the bubble generator that contacts the liquid layer to the top surface of the liquid layer. Having a relatively low liquid layer height in at least one stage of the humidifier and/or dehumidifier may, in some embodiments, advantageously result in a relatively low pressure drop between the inlet and outlet of an individual stage. Without wishing to be bound by a particular theory, the pressure drop across a given stage of the humidifier or dehumidifier may be due, at least in part, to the hydrostatic head of the liquid in the stage that the gas has to overcome. In addition, having a relatively low liquid layer height in at least one stage of the humidifier and/or dehumidifier may, in some embodiments, advantageously enhance heat and/or mass transfer. Without wishing to be bound by a particular theory, the theoretical maximum amount of heat and/or mass transfer in the humidifier and/or dehumidifier may occur under conditions where the gas reaches the same temperature as the liquid and the amount of vapor in the gas is exactly at the saturation concentration. The liquid layer height may determine how close the heat and/or mass transfer gets to the aforementioned theoretical maximum, although above a minimum liquid layer height the performance may be unaffected. Therefore, it may be advantageous to maintain the liquid layer height at the minimum required to operate the system without affecting performance.

In some embodiments, during operation of the humidifier and/or dehumidifier (e.g., substantially continuous operation and/or substantially transient operation), the liquid layer within at least one stage of the humidifier and/or dehumidifier has a height of about 0.1 m or less, about 0.09 m or less, about 0.08 m or less, about 0.07 m or less, about 0.06 m or less, about 0.05 m or less, about 0.04 m or less, about 0.03 m or less, about 0.02 m or less, about 0.01 m or less, or, in some cases, about 0.005 m or less. In some embodiments, during operation of the humidifier and/or dehumidifier, the liquid layer within at least one stage of the humidifier and/or dehumidifier has a height in the range of about 0 m to about 0.1 m, about 0 m to about 0.09 m, about 0 m to about 0.08 m, about 0 m to about 0.07 m, about 0 m to about 0.06 m, about 0 m to about 0.05 m, about 0 m to about 0.04 m, about 0 m to about 0.03 m, about 0 m to about 0.02 m, about 0 m to about 0.01 m, about 0 m to about 0.005 m, about 0.005 m to about 0.1 m, about 0.005 m to about 0.09 m, about 0.005 m to about 0.08 m, about 0.005 m to about 0.07 m, about 0.005 m to about 0.06 m, about 0.005 m to about 0.05 m, about 0.005 m to about 0.04 m, about 0.005 m to about 0.03 m, about 0.005 m to about 0.02 m, or about 0.005 m to about 0.01 m.

In some embodiments, during operation of the humidifier and/or dehumidifier (e.g., substantially continuous operation and/or substantially transient operation), the liquid layer within each stage of the humidifier and/or dehumidifier has a height of about 0.1 m or less, about 0.09 m or less, about 0.08 m or less, about 0.07 m or less, about 0.06 m or less, about 0.05 m or less, about 0.04 m or less, about 0.03 m or less, about 0.02 m or less, about 0.01 m or less, or, in some cases, about 0.005 m or less. In some embodiments, during operation of the humidifier and/or dehumidifier, the liquid layer within each stage of the humidifier and/or dehumidifier has a height in the range of about 0 m to about 0.1 m, about 0 m to about 0.09 m, about 0 m to about 0.08 m, about 0 m to about 0.07 m, about 0 m to about 0.06 m, about 0 m to about 0.05 m, about 0 m to about 0.04 m, about 0 m to about 0.03 m, about 0 m to about 0.02 m, about 0 m to about 0.01 m, about 0 m to about 0.005 m, about 0.005 m to about 0.1 m, about 0.005 m to about 0.09 m, about 0.005 m to about 0.08 m, about 0.005 m to about 0.07 m, about 0.005 m to about 0.06 m, about 0.005 m to about 0.05 m, about 0.005 m to about 0.04 m, about 0.005 m to about 0.03 m, about 0.005 m to about 0.02 m, or about 0.005 m to about 0.01 m.

In some embodiments, one or more stages of the humidifier and/or dehumidifier comprise one or more components configured to facilitate, direct, or otherwise affect flow of a fluid within the one or more stages.

For example, in some embodiments, one or more stages of the humidifier and/or dehumidifier comprise one or more weirs. As used herein, a weir refers to a structure that obstructs liquid flow in a stage. In some cases, a weir may be positioned adjacent or surrounding a region where liquid may flow out of stage, for example, into a different stage below. For example, if a weir is positioned upstream of a liquid outlet of a stage, any additional liquid that would cause the height of a liquid layer to exceed the height of the weir would flow over the weir and exit the stage through the liquid outlet. In some embodiments, the maximum height of a liquid layer in one or more stages of a humidifier and/or dehumidifier may be set by one or more weirs.

In some embodiments, one or more stages of the humidifier and/or dehumidifier comprise one or more baffles positioned to direct flow of a liquid stream within the one or more stages. Suitable baffles for use in embodiments described herein include plate-like articles having, for example, a substantially rectangular shape. Baffles may also be referred to as barriers, dams, or the like. In some cases, the one or more baffles can be arranged on a bottom surface of a stage such that liquid travels in a substantially linear path from one end of the stage to the other end of the stage (e.g., along the length of a stage having a substantially rectangular cross-section). In some cases, the one or more baffles can be arranged such that liquid travels in a non-linear path across a chamber, such as a path having one or more bends or turns within the chamber. That is, the liquid may travel a distance within the stage that is longer than the length of the stage. In some embodiments, one or more baffles may be positioned substantially parallel to the transverse sides (i.e., width) of a stage having a substantially rectangular cross-sectional shape, i.e., may be a transverse baffle. In some embodiments, one or more baffles may be positioned substantially parallel to the longitudinal sides (i.e., length) of a stage having a substantially rectangular cross-sectional shape, i.e., may be a longitudinal baffle. In such configurations, one or more longitudinal baffles may direct the flow of liquid along a substantially non-linear path. In some cases, it may be advantageous to increase the amount of time a liquid spends flowing through a stage. Accordingly, in certain embodiments, one or more baffles may be positioned within a single stage to facilitate liquid flow along a flow path having a relatively high aspect ratio (e.g., the ratio of the average length of the flow path to the average width of the flow path). For example, in some cases, one or more baffles may be positioned such that liquid flowing through the stage follows a flow path having an aspect ratio of at least about 1.5, at least about 2, at least about 5, at least about 10, at least about 20, at least about 50, at least about 75, at least about 100, or more. In some embodiments, liquid flowing through the stage follows a flow path having an aspect ratio in the range of about 1.5 to about 5, about 1.5 to about 10, about 1.5 to about 20, about 1.5 to about 50, about 1.5 to about 75, about 1.5 to about 100, about 5 to about 10, about 5 to about 20, about 5 to about 50, about 5 to about 75, about 5 to about 100, about 10 to about 20, about 10 to about 50, about 10 to about 75, about 10 to about 100, or about 50 to about 100.

In some embodiments, the humidifier and/or dehumidifier comprise one or more additional features to increase efficiency and/or production. Non-limiting examples of these features include stacks and/or droplet eliminators.

In certain embodiments, the humidifier and/or dehumidifier comprise an optional stack. A stack generally refers to a structure (e.g., conduit) in fluid communication with a gas outlet of the humidifier and/or dehumidifier, where the maximum cross-sectional dimension (e.g., diameter) and/or length of the stack is larger than the corresponding maximum cross-sectional dimension and/or length of the gas outlet. In some cases, a stack may reduce or eliminate droplet entrainment (e.g., droplets of liquid flowing out of the humidifier and/or dehumidifier with the gas stream).

In certain embodiments, the humidifier and/or dehumidifier comprise one or more optional droplet eliminators. A droplet eliminator generally refers to a device or structure configured to prevent entrainment of liquid droplets. Non-limiting examples of suitable types of droplet eliminators include mesh eliminators (e.g., wire mesh mist eliminators), vane eliminators (e.g., vertical flow chevron vane mist eliminators, horizontal flow chevron vane mist eliminators), cyclonic separators, vortex separators, droplet coalescers, and/or knockout drums. In some cases, the droplet eliminator may be configured such that liquid droplets entrained in a gas stream collide with a portion of the droplet eliminator and fall out of the gas stream. In certain embodiments, the droplet eliminator may extend across the opening (e.g., mouth) of one or more gas outlets of a humidifier or dehumidifier. In some cases, a droplet eliminator may be positioned within a humidifier and/or dehumidifier upstream of a gas outlet of the humidifier and/or dehumidifier. In some cases, reducing or eliminating droplet entrainment may advantageously increase the amount of condensable fluid in liquid phase (e.g., purified water) recovered from a humidifier and/or dehumidifier (e.g., by reducing the amount of condensable fluid lost through a gas outlet).

In some embodiments, the humidifier and/or dehumidifier comprise one or more intermediate gas inlets and/or intermediate gas outlets. In some cases, extraction of at least a portion of a gas flow from at least one intermediate location in the humidifier and injection into at least one intermediate location in the dehumidifier may be thermodynamically advantageous. Because the portion of a gas flow exiting the humidifier at an intermediate gas outlet (e.g., the extracted portion) has not passed through the entire humidifier, the temperature of the gas flow at the intermediate gas outlet may be lower than the temperature of the gas flow at the main gas outlet of the humidifier. The locations of the intermediate extraction points (e.g., gas outlets) and/or injection points (e.g., gas inlets) may be selected to increase the thermal efficiency of the system. For example, because a gas (e.g., air) may have increased vapor content at higher temperatures than at lower temperatures, and because the specific enthalpy of a gas with higher vapor content may be higher than the specific enthalpy of a gas with lower vapor content, less gas may be used in higher temperature areas of the humidifier and/or dehumidifier to better balance the heat capacity rate ratios of the gas (e.g., air) and liquid (e.g., water) streams. Extraction and/or injection of a portion of a gas flow at intermediate locations may therefore advantageously allow for manipulation of gas mass flows and for greater heat recovery.

However, it should be recognized that in some embodiments, under certain operating conditions, intermediate extraction and/or injection may not necessarily or always increase the thermal efficiency of an HDH system. Additionally, there may be certain drawbacks associated with extraction and/or injection at intermediate locations in some situations. For example, intermediate extraction and/or injection may reduce the condensable fluid (e.g., water) production rate of the system, and there may be certain additional costs associated with intermediate extraction and/or injection (e.g., costs associated with instrumentation, ducting, insulation, and/or droplet separation). In some cases, if the temperature difference between a gas flow at an intermediate injection location in the dehumidifier and a gas flow extracted from the humidifier and injected in the intermediate injection location is too great, production rates and/or energy efficiency may be decreased. Accordingly, in some cases, it may be advantageous to build and/or operate an apparatus without intermediate extraction and/or injection.

The humidifier and/or dehumidifier may have any shape suitable for a particular application. In some embodiments, the humidifier and/or dehumidifier have a cross-sectional shape that is substantially circular, substantially elliptical, substantially square, substantially rectangular, substantially triangular, or irregularly shaped. In some embodiments, the humidifier and/or dehumidifier have a relatively high cross-sectional aspect ratio. In certain cases, the humidifier and/or dehumidifier have a cross-sectional aspect ratio of at least about 1.5, at least about 2, at least about 5, at least about 10, at least about 15, or at least about 20. In some embodiments, the humidifier and/or dehumidifier has an aspect ratio in the range of about 1.5 to about 5, about 1.5 to about 10, about 1.5 to about 15, about 1.5 to about 20, about 2 to about 5, about 2 to about 10, about 2 to about 15, about 2 to about 20, about 5 to about 10, about 5 to about 15, about 5 to about 20, about 10 to about 15, about 10 to about 20, or about 15 to about 20. In certain embodiments, the humidifier and/or dehumidifier have a substantially parallelepiped shape, a substantially rectangular prismatic shape, a substantially cylindrical shape, a substantially pyramidal shape, and/or an irregular shape.

The exterior of the humidifier and/or dehumidifier may comprise any suitable material. In certain embodiments, the humidifier and/or dehumidifier comprise stainless steel, aluminum, and/or a plastic (e.g., polyvinyl chloride, polyethylene, polycarbonate). In some embodiments, it may be advantageous to minimize heat loss from the humidifier and/or dehumidifier to the environment. In some cases, the exterior and/or the interior of the humidifier and/or dehumidifier may comprise a thermally insulating material. For example, the humidifier and/or dehumidifier may be at least partially coated, covered, or wrapped with a thermally insulating material. Non-limiting examples of suitable thermally insulating materials include elastomeric foam, fiberglass, ceramic fiber mineral wool, glass mineral wool, phenolic foam, polyisocyanurate, polystyrene, and polyurethane.

In some cases, the humidifier and/or dehumidifier may have a relatively small size (e.g., relatively low height, relatively small footprint). In certain cases, it may be advantageous for a humidifier and/or dehumidifier to have a relatively small size. For example, a relatively low height and/or relatively small footprint may advantageously facilitate shipping (e.g., because the humidifier and/or dehumidifier may fit on existing truck beds) and/or installation of the humidifier and/or dehumidifier, particularly for systems located at remote sites.

In some embodiments, the humidifier and/or dehumidifier have a relatively low height. The height of a humidifier or dehumidifier may refer to the maximum vertical distance between a first end (e.g., a top end) and a second end (e.g., a bottom end) of the humidifier or dehumidifier. In some cases, the humidifier and/or dehumidifier have a height of about 5 m or less, about 4 m or less, about 3.5 or less, about 3 m or less, about 2 m or less, about 1 m or less, or, in some cases, about 0.5 m or less. In certain cases, the humidifier and/or dehumidifier have a height in the range of about 1 m to about 5 m, about 1 m to about 4 m, about 1 m to about 3.5 m, about 1 m to about 3 m, or about 1 m to about 2 m.

In some embodiments, the humidifier and/or dehumidifier have a relatively small footprint (e.g., surface area of a bottom surface of the humidifier and/or dehumidifier). In certain embodiments, the humidifier and/or dehumidifier have a footprint of about 100 $m^2$ or less, about 75 $m^2$ or less, about 50 $m^2$ or less, about 20 $m^2$ or less, about 10 $m^2$ or less, about 5 $m^2$ or less, about 2 $m^2$ or less, or about 1 $m^2$ or less. In some cases, the humidifier and/or dehumidifier have a footprint in the range of about 1 $m^2$ to about 100 $m^2$, about 1 $m^2$ to about 75 $m^2$, about 1 $m^2$ to about 50 $m^2$, about 1 $m^2$ to about 20 $m^2$, about 1 $m^2$ to about 10 $m^2$, or about 1 $m^2$ to about 5 $m^2$.

According to some embodiments, the humidifier and dehumidifier are housed in separate vessels. In other embodiments, the humidifier and dehumidifier are housed within the same vessel. In some such cases, the humidifier and dehumidifier may be vertically arranged (e.g., the dehumidifier positioned on top of the humidifier) or horizontally arranged. Housing the humidifier and dehumidifier within the same vessel may be advantageous in certain cases, as a combined HDH apparatus may have fewer components and/or use less material than an HDH system comprising a separate humidifier and dehumidifier.

In some embodiments, the humidifier and/or dehumidifier may be fluidly connected to one or more additional devices. For example, in some embodiments, the dehumidifier may be fluidically connected to an optional external cooling device. The cooling device may, in some cases, also be fluidically connected to the second heat exchanger. In certain embodiments, the cooling device may be arranged such that a liquid stream (e.g., a dehumidifier liquid outlet stream, a cooled dehumidifier liquid outlet stream) is cooled in the cooling device prior to returning to the dehumidifier.

A cooling device generally refers to any device that is capable of removing heat from a fluid stream (e.g., a liquid stream, a gas stream). In some embodiments, the cooling device is a heat exchanger. The heat exchanger may be configured such that a first fluid stream and a second fluid stream flow through the heat exchanger. In some cases, the first fluid stream and the second fluid stream may flow in substantially the same direction (e.g., parallel flow), substantially opposite directions (e.g., counter-flow), or substantially perpendicular directions (e.g., cross flow). In some cases, heat is transferred from a first fluid stream to a second fluid stream. In certain embodiments, the cooling device is a liquid-to-gas heat exchanger. The first fluid stream may, in certain cases, comprise a fluid stream that is part of a loop of condenser liquid flowing between a condenser and a heat exchanger (e.g., a dehumidifier liquid outlet stream). The second fluid stream may, in some cases, comprise a coolant. The coolant may be any fluid capable of absorbing or transferring heat. In some embodiments, the coolant comprises a gas. The gas may, in some cases, comprise air (e.g., ambient air). Heat exchangers that comprise air as a coolant may generally be referred to as air-cooled heat exchangers. In some cases, more than two fluid streams flow through the cooling device. In some embodiments, none of the fluid streams flowing through cooling device may undergo a phase change. It should also be noted that the cooling device may, in some embodiments, be a dry cooler, a chiller, a radiator, or any other device capable of removing heat from a fluid stream.

The cooling device may, in some cases, decrease the temperature of a fluid stream (e.g., a dehumidifier liquid outlet stream). In some embodiments, the cooling device decreases the temperature of the fluid stream by at least about 5° C., at least about 10° C., at least about 15° C., at least about 20° C., at least about 30° C., at least about 40° C., at least about 50° C., at least about 60° C., at least about 70° C., at least about 80° C., or, in some cases, at least about 90° C. In some embodiments, the cooling device decreases the temperature of the fluid stream by an amount in the range of about 5° C. to about 30° C., about 5° C. to about 60° C., about 5° C. to about 90° C., about 10° C. to about 30° C., about 10° C. to about 60° C., about 10° C. to about 90° C., about 20° C. to about 30° C., about 20° C. to about 60° C., about 20° C. to about 90° C., about 30° C. to about 60° C., about 30° C. to about 90° C., or about 60° C. to about 90° C.

In some embodiments, the humidifier may be fluidically connected to an optional pre-treatment system. In some cases, a pre-treatment system may be configured to remove one or more components from an influent liquid stream entering the system. In some embodiments, the pre-treatment system comprises an optional separation apparatus configured to remove at least a portion of a suspended and/or emulsified immiscible phase from a liquid stream. In some embodiments, the pre-treatment system comprises an optional ion-removal apparatus configured to remove at least a portion of at least one scale-forming ion from a liquid stream. In some embodiments, the pre-treatment system comprises an optional suspended solids removal apparatus configured to remove at least a portion of suspended solids from a liquid stream. In some embodiments, the pre-treatment system comprises an optional pH adjustment apparatus configured to adjust (i.e. increase or decrease) or maintain/stabilize (e.g. via buffering) the pH of a liquid stream. In some embodiments, the pre-treatment system comprises an optional volatile organic material (VOM) removal apparatus configured to remove at least a portion of VOM from a liquid stream. In some embodiments, the pre-treatment system comprises an optional filtration apparatus configured to produce a substantially solid material. Each component of the pre-treatment system may be fluidly connected to one or more other components of pre-treatment system, either directly or indirectly.

In some embodiments, the humidifier may be fluidically connected to an optional precipitation apparatus. In some cases, a precipitation apparatus may be configured to precipitate one or more solid salts from a concentrated liquid stream of the humidifier comprising a dissolved salt (e.g., a humidifier liquid outlet stream). In some cases, the precipitation apparatus comprises a vessel, such as a settling tank. In some embodiments, the settling tank comprises a low shear mixer. The low shear mixer can be configured to keep the crystals that are formed mixed (e.g., homogeneously mixed) in the concentrated liquid stream. According to certain embodiments, the vessel is sized such that there is sufficient residence time for crystals to form and grow. In some cases, the precipitation apparatus comprises at least one vessel comprising a volume within which the concentrated liquid stream is substantially quiescent. In some embodiments, the flow velocity of the liquid stream within the substantially quiescent volume is less than the flow velocity at which precipitation (e.g., crystallization) is inhibited. For example, the liquid stream within the substantially quiescent volume may have, in certain embodiments, a flow velocity of zero. In some embodiments, the fluid within the substantially quiescent volume may have a flow velocity that is sufficiently high to suspend the formed solids (e.g., crystals), but not sufficiently high to prevent solid formation (e.g., crystal nucleation). The substantially quiescent volume within the vessel may occupy, in some embodiments, at least about 1%, at least about 5%, at least about 10%, or at least about 25% of the volume of the vessel. As one particular example, the precipitation apparatus can comprise a vessel including a stagnation zone. The stagnation zone may be positioned, for example, at the bottom of the precipitation vessel.

In certain embodiments, the precipitation apparatus can include a second vessel in which the solids precipitated in the first vessel are allowed to settle. For example, an aqueous stream containing the precipitated solids can be transported to a settling tank, where the solids can be allowed to settle. The remaining contents of the aqueous stream can be transported out of the settling tank. While the use of two vessels within the precipitation apparatus has been described, it should be understood that, in other embodiments, a single vessel, or more than two vessels may be employed. In certain embodiments, the system can be operated such that precipitation of the salt occurs substantially only within the stagnation zone of the precipitation vessel.

In some embodiments, the precipitated salt from the precipitation apparatus is fed to a solids-handling apparatus. The solids-handling apparatus may be configured, in certain embodiments, to remove at least a portion of the water retained by the precipitated salt. In some such embodiments, the solids-handling apparatus is configured to produce a cake comprising at least a portion of the precipitated salt from the precipitation apparatus. As one example, the solids-handling apparatus can comprise a filter (e.g., a vacuum drum filter or a filter press) configured to at least partially separate the precipitated salt from the remainder of a suspension containing the precipitated salt. In some such embodiments, at least a portion of the liquid within the salt suspension can be transported through the filter, leaving behind solid precipitated salt.

Appropriate conditions under which to operate the systems (e.g., HDH systems) described herein for desired performance may be selected by an operator of the system and/or by an algorithm. In some embodiments, the pressure in the humidifier and/or dehumidifier may be selected to be approximately ambient atmospheric pressure during operation. According to certain embodiments, the pressure in the humidifier and/or dehumidifier may be selected to be about 90 kPa or less during operation. It may be desirable, in some embodiments, for the pressure in the humidifier to be less than approximately ambient atmospheric pressure during operation. In some cases, as the pressure inside the humidifier decreases, the ability of the humidified carrier gas to carry more water vapor increases, allowing for increased production of substantially pure water when the carrier gas is dehumidified in the dehumidifier. Without wishing to be bound by a particular theory, this effect may be explained by the humidity ratio, which generally refers to the ratio of water vapor mass to dry air mass in moist air, being higher at pressures lower than atmospheric pressure.

In some embodiments, the humidifier and/or dehumidifier may have a relatively low pressure drop during operation. As used herein, the pressure drop across a humidifier or dehumidifier refers to the difference between the pressure of a gas stream entering the humidifier or dehumidifier at a main gas inlet and the pressure of a gas stream exiting the humidifier or dehumidifier at a main gas outlet. In some cases, the pressure drop may not include the effect of pressure-increasing devices (e.g., fans, blowers, compressors, pumps). For example, in certain cases, the pressure drop may be obtained by subtracting the effect of one or more pressure-increasing devices on a gas stream from the difference between the pressure of the gas stream entering the humidifier or dehumidifier at a main gas inlet and the pressure of the gas stream exiting the humidifier or dehumidifier at a main gas outlet. In some embodiments, the pressure drop across the humidifier or dehumidifier is about 100 kPa or less, about 75 kPa or less, about 50 kPa or less, about 20 kPa or less, about 15 kPa or less, about 10 kPa or less, about 5 kPa or less, about 2 kPa or less, or about 1 kPa or less. In certain embodiments, the pressure drop across the humidifier or dehumidifier (e.g., difference in pressure between the main gas outlet and the main gas inlet) is in the range of about 1 kPa to about 2 kPa, about 1 kPa to about 5 kPa, about 1 kPa to about 10 kPa, about 1 kPa to about 15 kPa, about 1 kPa to about 20 kPa, about 1 kPa to about 50 kPa, about 1 kPa to about 75 kPa, or about 1 kPa to about 100 kPa. In some embodiments, the pressure drop is substantially zero.

According to some embodiments, systems described herein (e.g., HDH systems) are substantially continuously operated and/or configured to facilitate substantially continuous operation. As used herein, a continuously-operated system refers to a system in which an influent liquid stream is fed to the system at the same rate that a condensable liquid stream is produced by the system. In some cases, one or more liquid streams within the system may be in substantially continuous motion. For example, for a bubble column HDH system, an influent liquid stream may be fed to a component of the system (e.g., a second heat exchanger, a heating device, a humidifier, a dehumidifier), substantially continuously flow through one or more stages of the humidifier or dehumidifier of the system, and result in production of a condensable liquid stream (e.g., a substantially pure water stream). In some cases, a continuously-operated system may be associated with certain advantages, including, but not limited to, increased uptime and/or enhanced energy performance.

In some embodiments, the system (e.g., HDH system) is substantially transiently operated and/or configured to facilitate substantially transient operation (e.g., batch processing). As used herein, a transiently-operated system refers to a system in which an amount of liquid (e.g., salt-containing water) is introduced into the system and remains in the system until a certain condition (e.g., a certain salinity, a certain density) is reached. Upon satisfaction of the condition, the liquid is discharged from the apparatus. In certain cases, transient operation may allow cleaning operations to be interspersed with production operations. For example, transient operation may be advantageous for systems comprising filter presses, bioreactors, and/or other systems that may require periodic cleaning. In some cases, transient operation may advantageously facilitate processing of highly viscous liquids (e.g., sugar-containing feedstock) that may be difficult to pump.

It should be noted that while the systems (e.g., HDH systems) described herein have generally been discussed in the context of desalination systems, the systems may be used in other types of systems (e.g., other water treatment/purification systems). For example, the described systems may be used in separation processes to separate one or more components of an input liquid stream (e.g., a liquid mixture). In a particular, non-limiting embodiment, the described systems may be used in distillation systems to distill certain liquids from liquid mixtures (e.g., ionic solutions). Examples of liquids that may be distilled from liquid mixtures using the systems described herein include, but are not limited to, ammonia, benzene, toluene, phenol, xylene, naphthalene, xylene, gasoline, methanol, ethanol, propanol, butanol, isopropyl alcohol, propylene glycol, hexane-n, heptane-n, octane-n, cyclohexane, acetic acid, formic acid, nitric acid, carbon tetrachloride, methyl acetate, and/or acetone.

Various of the components described herein can be "directly fluidly connected" to other components. As used herein, a direct fluid connection exists between a first component and a second component (and the two components are said to be "directly fluidly connected" to each other) when they are fluidly connected to each other and the composition of the fluid does not substantially change (i.e., no fluid component changes in relative abundance by more than 5% and no phase change occurs) as it is transported from the first component to the second component. As an illustrative example, a stream that connects first and second system components, and in which the pressure and temperature of the fluid is adjusted but the composition of the fluid is not altered, would be said to directly fluidly connect the first and second components. If, on the other hand, a separation step is performed and/or a chemical reaction is performed that substantially alters the composition of the stream contents during passage from the first component to the second component, the stream would not be said to directly fluidly connect the first and second components.

Other examples of HDH systems are described in U.S. Pat. No. 8,292,272, by Elsharqawy et al., issued Oct. 23, 2012, entitled "Water Separation Under Reduced Pressure"; U.S. Pat. No. 8,465,006, by Elsharqawy et al., issued Jun. 18, 2013, entitled "Separation of a Vaporizable Component Under Reduced Pressure"; U.S. Pat. No. 8,252,092, by Govindan et al., issued Aug. 28, 2012, entitled "Water Separation Under Varied Pressure"; U.S. Pat. No. 8,496,234, by Govindan et al., issued Jul. 30, 2013, entitled "Thermodynamic Balancing of Combined Heat and Mass Exchange Devices"; U.S. Pat. No. 8,523,985, by Govindan et al., issued Sep. 3, 2013, entitled "Bubble-Column Vapor Mixture Condenser"; U.S. Pat. No. 8,778,065, by Govindan et al., issued Jul. 15, 2014, entitled "Humidification-Dehumidification System Including a Bubble-Column Vapor Mixture Condenser"; U.S. Pat. No. 9,072,984, by Govindan et al., issued Jul. 7, 2015, entitled "Bubble-Column Vapor Mixture Condenser"; U.S. Patent Publication No. 2015/0129410, by Govindan et al., filed Sep. 12, 2014, entitled "Systems Including a Condensing Apparatus Such as a Bubble Column Condenser"; and International Patent Publication No. WO 2014/200829, by Govindan et al., filed Jun. 6, 2014, as International Patent Application No. PCT/US2014/041226, and entitled "Multi-Stage Bubble Column Humidifier," the contents of all of which are incorporated herein by reference in their entireties for all purposes.

Example

In this Example, an HDH system comprising a bubble column humidifier and a bubble column condenser is described. The system contained five fluid paths: an air flow path, a main brine flow path, a top tray recirculation flow path, a heated liquid flow path associated with an electric heater, and a pure water flow path.

Figure 4:
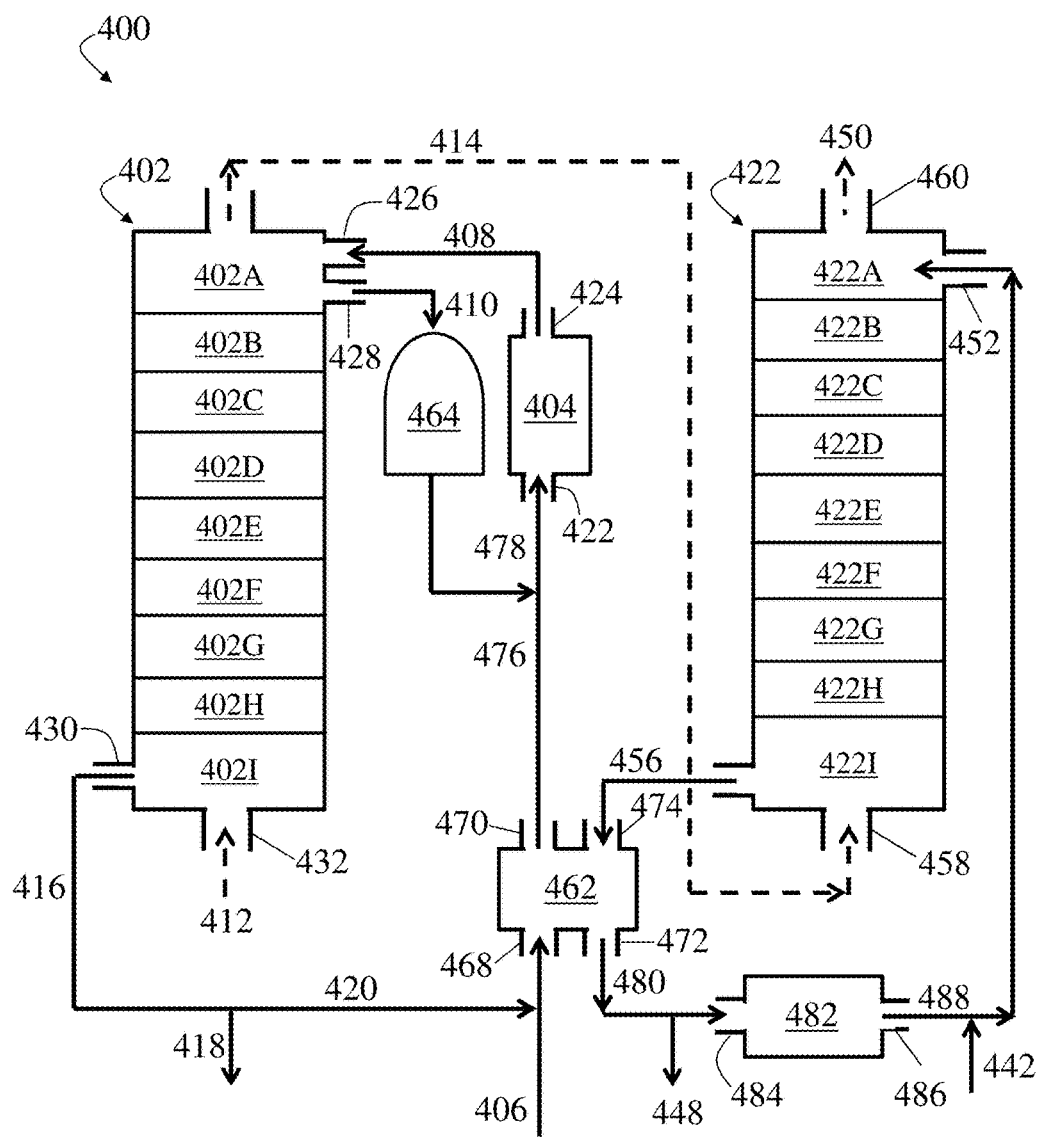
FIG. 4 shows a schematic diagram of an exemplary system comprising a multi-stage humidifier, a multi-stage dehumidifier, a heating device, a heat exchanger, a storage tank, and an air-cooled heat exchanger, according to some embodiments.

FIG. 4 is a schematic diagram of the HDH system. The system comprised a multi-stage bubble column humidifier 402, a multi-stage bubble column condenser 422, an electric heater 404, a titanium plate-and-frame heat exchanger 432, an air-cooled heat exchanger 444, and a storage tank 434. Bubble column humidifier 402 comprised a plurality of stages comprising first stage 402A, last stage 402H, and intermediate stages 402B-402G. In addition, bubble column humidifier 402 comprised sump volume 4021 positioned below stages 402A-402H. Bubble column condenser 422 comprised a plurality of stages comprising first stage 422A, last stage 422H, and intermediate stages 422B-422G. In addition, bubble column condenser 422 comprised sump volume 4221 positioned below stages 422A-422H.

The system comprised an air flow path. At a main humidifier air inlet of humidifier 402, a blower forced air stream 412 to enter humidifier 402. Air stream 412 flowed through humidifier 402 from last stage 402H to first stage 402A, and as air stream 412 flowed through humidifier 402, heat and mass were transferred to air stream 412 from a liquid stream to produce a humidified air stream. The humidified air stream exited humidifier 402 through a main humidifier gas outlet as vapor-containing humidifier gas outlet stream 414. Stream 414 was directed to flow to bubble column condenser 422. In bubble column condenser 422, stream 414 flowed from last stage 422H to first stage 422A. Within bubble column condenser 422, heat and mass were transferred from vapor-containing humidifier gas outlet stream 414 to a liquid stream to produce a dehumidified gas stream. The dehumidified gas stream was discharged from dehumidifier 422 through a main dehumidifier gas outlet as dehumidifier gas outlet stream 426.

The flow of the air stream through the air flow path was controlled by the blower's variable frequency drive (VFD), which set the speed of the blower's rotation. The flow rate of the air stream was measured at the outlet of the blower by a pitot tube.

Brine was circulated through the system along two connected flow paths: a main flow path, which circulated through all eight trays of humidifier 402, and a top tray recirculation flow path.

The main flow path included all eight trays of humidifier 402, a VFD-controlled pump, energy recovery heat exchanger 432, and heating device 404, which added thermal energy to the system. Volumetric flow rate was measured by a paddle wheel flow meter, and temperature was measured by type K thermocouples. A feedback control system maintained the temperature of the brine entering humidifier 402 at a substantially constant temperature. The feedback control system adjusted the rate of the heating fluid stream flowing through a second fluidic pathway of heating device 404 in order to heat the brine to a selected temperature prior to entering humidifier 402.

The top tray recirculation flow path included heating device 404, first stage 402A of humidifier 402, storage tank 434, and a VFD-controlled pump. The recirculation flow was injected into the main flow through a tee between heat exchanger 432 and heating device 404. The combined flow was heated in heating device 404, then partially cooled and concentrated in first stage 402A of the humidifier 402. After flowing through first stage 402A, a portion 410 of the combined flow was extracted from humidifier 402 through a secondary humidifier liquid outlet, which gravity fed to storage tank 434. During operation, the extraction flow was matched with the injection flow by controlling the extraction rate with a gate valve and the injection rate through the pump's VFD.

The pure water flow path included bubble column condenser 422, a VFD-controlled pump, energy recovery heat exchanger 432, and air-cooled heat exchanger 444. A partial bypass of air-cooled heat exchanger 444 was controlled with a gate valve, which controlled temperature into bubble column condenser 422.

The effect of top tray recirculation was measured by first bringing the HDH system to steady-state, balanced conditions with no recirculation, then successively lowering the heated brine temperature and correspondingly increasing the top tray recirculation rate to maintain a constant enthalpy change across the top tray. The humidifier was initially balanced for a top temperature of 180° F.

Under the initial steady-state conditions, the air inlet flow rate was 44.4 ACFM, the brine flow rate was 3 gpm, and the pure water flow rate was 3 gpm. The temperatures at the fluid inlets and outlets of the humidifier and dehumidifier are shown in Table 1.

TABLE 1

| Location | Temperature (° F.) |
|---|---|
| Humidifier brine inlet | 180 |
| Humidifier air inlet | 136 |
| Humidifier brine outlet | 124 |
| Humidifier air outlet | 167 |
| Top tray temperature | 166 |
| Dehumidifier pure water inlet | 127 |
| Dehumidifier air inlet | 167 |
| Dehumidifier pure water outlet | 166 |
| Dehumidifier air outlet | 125 |

Top tray recirculation was then introduced, and the temperature of heated combined stream 408 exiting heating device 404 was reduced according to Table 2. Rates were calculated such that the temperature of the brine and air exiting first stage 402A would be unchanged. All other flow rates were maintained. Extraction and injection flow rates were matched.

TABLE 2

| Set Point Temperature (° F.) | Recirculation Rate (gpm) |
|---|---|
| 180 | 0 |
| 178 | 0.5 |
| 177 | 1 |
| 175 | 2 |
| 174 | 3 |

Once the system reached steady state at each of the above 5 points, temperatures and flow rates were recorded. Two sets of data were collected for each temperature and flow rate combination.

In addition, the experiment was repeated using a higher top brine temperature of 192° F. Under the second set of conditions, the air inlet flow rate was 44.4 ACFM, the brine flow rate was 4 gpm, and the pure water flow rate was 4 pm. The initial temperatures are shown in Table 3.

TABLE 3

| Location | Temperature (° F.) |
|---|---|
| Humidifier brine inlet | 192 |
| Humidifier air inlet | 149 |
| Humidifier brine outlet | 134 |
| Humidifier air outlet | 177 |
| Top tray temperature | 176 |
| Dehumidifier pure water inlet | 139 |
| Dehumidifier air inlet | 177 |
| Dehumidifier pure water outlet | 172 |
| Dehumidifier air outlet | 139 |

The brine inlet temperatures and corresponding top tray recirculation flow rates, which were selected to maintain a constant brine enthalpy change, are shown in Table 4.

| Set Point Temperature (° F.) | Recirculation Rate (gpm) |
|---|---|
| 192 | 0 |
| 189 | 1 |
| 187 | 2 |
| 185 | 3 |
| 184 | 4 |
| 183 | 5 |
| 182 | 6 |

It was found that the humidifier air outlet temperature was relatively unchanged at different top brine temperatures. The invariance demonstrated that flow rate and temperature, individually, do not have a strong effect on heat transfer in a bubble column. The constant air temperature corresponded to a constant enthalpy transfer from the brine, as shown in Table 5. While there was some variance in the enthalpy transfer rate, the variance was on the same order as the enthalpy variance in the humidified air. Small changes in humidified air temperature corresponded to a large change in the enthalpy of the humidified air due to the change in vapor capacity and latent heat contained therein.

TABLE 5

| Influent brine flow rate (gpm) | Influent brine temperature (° F.) | Effluent brine temperature (° F.) | Enthalpy transfer rate (BTU/h) |
| --- | --- | --- | --- |
| 3 | 180 | 166 | 341 |
| 3 | 180 | 167 | 314 |
| 3.5 | 178 | 169 | 240 |
| 3.5 | 179 | 168 | 287 |
| 4 | 176 | 167 | 292 |
| 4 | 177 | 168 | 293 |
| 5 | 175 | 168 | 281 |
| 5 | 175 | 168 | 299 |
| 6 | 173 | 169 | 227 |
| 6 | 173 | 168 | 257 |

The temperature of brine exiting second stage 402B was also measured to evaluate the effect of top tray extraction and recirculation on the rest of humidifier 402 (i.e., stages 402B-402H). It was found that the temperature was relatively constant, indicating similarly constant influent conditions to the lower sections of humidifier 402. The invariance demonstrated that the top tray recirculation had little effect on downstream stages.

In addition, production rate and gained output ratio (GOR) were calculated. Production rate was calculated from the product of the mass flow of the air and the difference in humidity ratios between the dehumidifier's influent and effluent air streams. Gained output ratio (GOR) was calculated as the quotient of the production rate and the enthalpy transfer rate across heating device 404, expressed as an equivalent mass rate of steam. GOR is an energy efficiency metric, frequently used to compare thermal desalination processes, which is approximately equal to the number of times a unit of thermal energy is used and recycled in a system.

Figure 5A:
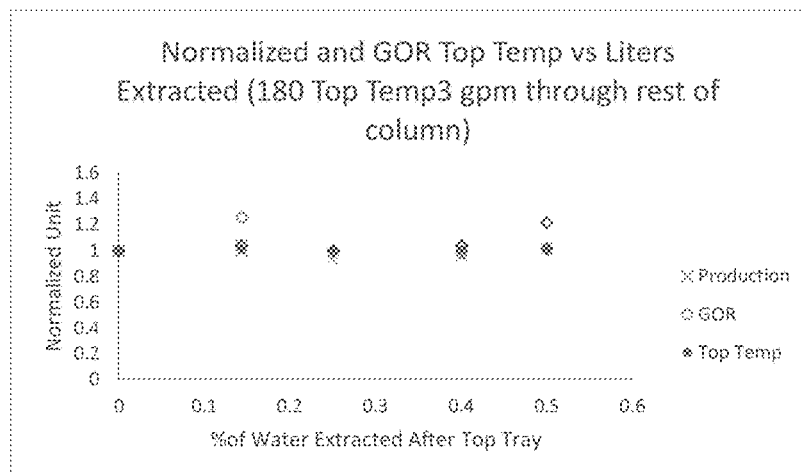
FIG. 5A shows, according to some embodiments, a plot of production rate, gained output ratio (GOR), and top liquid temperature as a function of the percent of water extracted after the top tray for experiments conducted on a system thermally balanced for an initial top liquid temperature of 180° F.

In FIG. 5A, the effect of top tray recirculation on production rate, GOR, and top brine temperature is shown. Each value was normalized by the respective value under the initial steady state conditions. The relative invariance of production rate, GOR, and top brine temperature shown in FIG. 5A demonstrated that top tray recirculation could be used to reduce humidifier inlet temperature without sacrificing production or thermal efficiency.

Figure 5B:
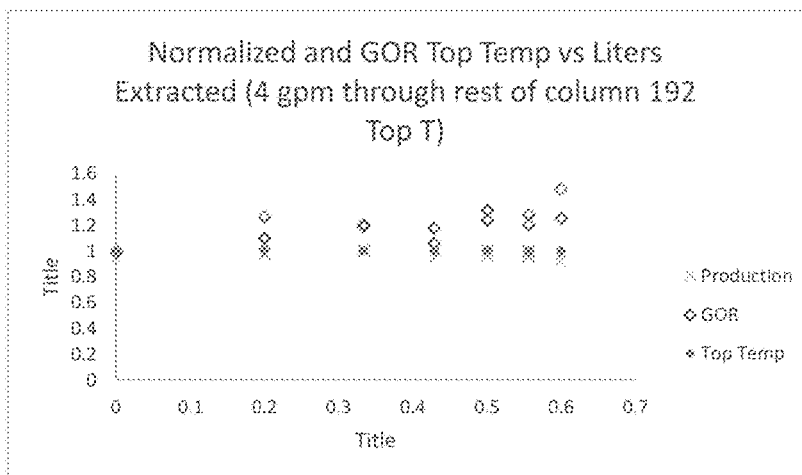
FIG. 5B shows, according to some embodiments, a plot of production rate, gained output ratio (GOR), and top liquid temperature as a function of the percent of water extracted after the top tray for experiments conducted on a system thermally balanced for an initial top liquid temperature of 192° F.

The conclusions were supported by the higher temperature experiment. FIG. 5B shows the effect of top tray recirculation on production rate, GOR, and top brine temperature in the higher temperature (192° F.) experiment. FIG. 5B also demonstrated relative invariance of production rate, GOR, and top brine temperature.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively.

In cases where the present specification and a document incorporated by reference, attached as an appendix, and/or referred to herein include conflicting disclosure, and/or inconsistent use of terminology, and/or the incorporated/appended/referenced documents use or define terms differently than they are used or defined in the present specification, the present specification shall control.

What is claimed is:

1. A method of operating a humidifier, comprising:
    flowing a first liquid stream comprising a condensable fluid in liquid phase and a dissolved salt through a first fluidic pathway of a first heating device, wherein the first liquid stream is heated within the first heating device to form a heated first liquid stream;
    injecting the heated first liquid stream into a main liquid inlet of a humidifier comprising a plurality of stages, wherein the plurality of stages comprises a first stage, a last stage, and one or more intermediate stages positioned between the first stage and the last stage;
    injecting a gas stream comprising a non-condensable gas into a main gas inlet of the humidifier;
    flowing the heated first liquid stream through the humidifier in a first direction from the first stage to the last stage and simultaneously flowing the gas stream through the humidifier in a second direction from the last stage to the first stage, wherein heat and mass are transferred from the heated first liquid stream to the gas stream to produce a vapor-containing humidifier gas outlet stream and a concentrated liquid stream; and
    flowing an extracted liquid stream comprising at least a portion of the concentrated liquid stream from an intermediate liquid outlet of the humidifier to the first heating device, wherein the intermediate liquid outlet of the humidifier is a liquid outlet of the first stage or one of the one or more intermediate stages of the humidifier;
    wherein the method further comprises flowing the first liquid stream through a second heating device.

2. The method according to claim 1, wherein the temperature of the heated first liquid stream at the main liquid inlet of the humidifier is about 90° C. or less.

3. The method according to claim 1, wherein a flow rate of the extracted liquid stream at the intermediate liquid outlet of the humidifier is about 5% to about 50% of a flow rate of the concentrated liquid stream at a main liquid outlet of the humidifier.

4. The method according to claim 1, wherein a flow rate of the extracted liquid stream at the intermediate liquid outlet of the humidifier is about 105% to about 150% of a flow rate of the concentrated liquid stream at a main liquid outlet of the humidifier.

5. The method according to claim 1, wherein the humidifier is a bubble column humidifier.

6. The method according to claim 1, wherein at least one stage of the plurality of stages of the humidifier comprises a bubble generator.

7. The method according to claim 6, wherein the bubble generator comprises a sparger plate comprising a plurality of holes.

8. The method according to claim 1, wherein at least one stage of the plurality of stages of the humidifier comprises a liquid layer comprising an amount of the heated first liquid stream and a vapor distribution region positioned adjacent the liquid layer.

9. The method according to claim 1, further comprising flowing the vapor-containing humidifier gas outlet stream from a main gas outlet of the humidifier to a main gas inlet of a dehumidifier configured to remove at least a portion of the condensable fluid in vapor phase from the vapor-containing humidifier gas outlet stream to produce a dehumidifier liquid outlet stream and a dehumidifier gas outlet stream.

10. The method according to claim 9, wherein the dehumidifier is a bubble column condenser.

11. The method according to claim 1, wherein the first heating device is a first heat exchanger, a heat collection device, an electric heater, or a furnace.

12. The method according to claim 11, further comprising flowing a heating fluid stream through a second fluidic pathway of the first heating device.

13. The method according to claim 1, wherein:
    the first heating device is a first heat exchanger,
    the second heating device is a second heat exchanger, and
    flowing the first liquid stream through the second heating device comprises flowing the first liquid stream through a first fluidic pathway of the second heat exchanger, and simultaneously flowing the dehumidifier liquid outlet stream through a second fluidic pathway of the second heat exchanger, such that heat is transferred from the dehumidifier liquid outlet stream to the first liquid stream to form a pre-heated first liquid stream.

14. The method according to claim 13, further comprising flowing the pre-heated first liquid stream to the first heating device to form the heated first liquid stream.

15. The method according to claim 1, further comprising flowing the heated first liquid stream to an intermediate humidifier liquid inlet, wherein the intermediate humidifier liquid inlet is a liquid inlet of the last stage or one of the one or more intermediate stages of the humidifier.

16. The method according to claim 1, further comprising flowing the extracted liquid stream from the intermediate liquid outlet of the humidifier to a first tank prior to flowing the extracted liquid stream to the first heating device.

17. The method according to claim 1, wherein the condensable fluid is water.

18. The method according to claim 1, wherein the dissolved salt comprises NaCl.

19. A method of operating a humidifier, comprising:
    flowing a first liquid stream comprising a condensable fluid in liquid phase and a dissolved salt through a first fluidic pathway of a first heating device, wherein the first liquid stream is heated within the first heating device to form a heated first liquid stream;
    injecting the heated first liquid stream into a main liquid inlet of a humidifier comprising a plurality of stages, wherein the plurality of stages comprises a first stage, a last stage, and one or more intermediate stages positioned between the first stage and the last stage;

injecting a gas stream comprising a non-condensable gas into a main gas inlet of the humidifier;

flowing the heated first liquid stream through the humidifier in a first direction from the first stage to the last stage and simultaneously flowing the gas stream through the humidifier in a second direction from the last stage to the first stage, wherein heat and mass are transferred from the heated first liquid stream to the gas stream to produce a vapor-containing humidifier gas outlet stream and a concentrated liquid stream;

flowing an extracted liquid stream comprising at least a portion of the concentrated liquid stream from an intermediate liquid outlet of the humidifier to a first tank; and after flowing the extracted liquid stream to the first tank, flowing the extracted liquid stream to the first heating device, wherein the intermediate liquid outlet of the humidifier is a liquid outlet of the first stage or one of the one or more intermediate stages of the humidifier.

20. The method according to claim 19, wherein the temperature of the heated first liquid stream at the main liquid inlet of the humidifier is about 90° C. or less.

* * * * *